US011518914B2

(12) United States Patent
Heimink et al.

(10) Patent No.: US 11,518,914 B2
(45) Date of Patent: Dec. 6, 2022

(54) PRESSURE SENSITIVE ADHESIVE ASSEMBLY COMPRISING FILLER MATERIAL

(71) Applicant: 3M INNOVATIVE PROPERTIES COMPANY, St. Paul, MN (US)

(72) Inventors: Jan Heimink, Schwelm (DE); Kerstin Unverhau, Neuss (DE); Jan D. Forster, Aachen (DE); Jan U. Wieneke, Dusseldorf (DE); Frank Kuester, Dusseldorf (DE); Siegfried R. Goeb, Willich (DE); Doreen Eckhardt, Dormagen (DE); Regina Sikora, Neuss (DE); Ruchi Pandey, Bangalore (IN); Suresh S. Iyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 128 days.

(21) Appl. No.: 14/888,810

(22) PCT Filed: May 13, 2014

(86) PCT No.: PCT/US2014/037771
§ 371 (c)(1),
(2) Date: Nov. 3, 2015

(87) PCT Pub. No.: WO2014/186316
PCT Pub. Date: Nov. 20, 2014

(65) Prior Publication Data
US 2016/0083628 A1 Mar. 24, 2016

(30) Foreign Application Priority Data
May 17, 2013 (EP) .................................... 13168253

(51) Int. Cl.
| *C09J 7/10* | (2018.01) |
| *C08K 9/06* | (2006.01) |
| *C09J 11/04* | (2006.01) |
| *C09C 3/12* | (2006.01) |
| *C09C 1/28* | (2006.01) |
| *C09J 133/08* | (2006.01) |
| *C08K 7/28* | (2006.01) |
| *C08K 7/26* | (2006.01) |

(52) U.S. Cl.
CPC .................. *C09J 7/10* (2018.01); *C08K 9/06* (2013.01); *C09C 1/28* (2013.01); *C09C 3/12* (2013.01); *C09J 11/04* (2013.01); *C09J 133/08* (2013.01); *C01P 2004/34* (2013.01); *C08K 7/26* (2013.01); *C08K 7/28* (2013.01); *C09J 2301/208* (2020.08); *C09J 2301/302* (2020.08); *C09J 2301/408* (2020.08); *C09J 2301/412* (2020.08); *C09J 2400/24* (2013.01); *C09J 2433/00* (2013.01)

(58) Field of Classification Search
CPC ............. C09J 133/08; C08K 9/06; C09C 1/28
See application file for complete search history.

(56) References Cited

U.S. PATENT DOCUMENTS

| 4,255,489 A | 3/1981 | Nielsen |
| 4,415,615 A | 11/1983 | Esmay |
| 4,710,536 A | 12/1987 | Klingen |
| 6,428,631 B1 | 8/2002 | Tomokiyo |
| 6,635,735 B1 * | 10/2003 | Zhang .................. C09D 183/04 |
| | | 502/171 |
| 6,777,079 B2 | 8/2004 | Zhou |
| 7,910,163 B2 | 3/2011 | Zollner |
| 7,935,383 B2 | 5/2011 | Zollner |
| 8,318,970 B2 | 11/2012 | Meisenburg |
| 8,449,962 B2 | 5/2013 | Prenzel |
| 8,802,777 B2 | 8/2014 | Zollner |
| 2002/0004130 A1 | 1/2002 | Lhila |
| 2003/0138624 A1 | 7/2003 | Burmeister |
| 2004/0131846 A1 * | 7/2004 | Epple .......................... C09J 7/10 |
| | | 428/345 |
| 2007/0005241 A1 | 1/2007 | Sumizawa |
| 2009/0053447 A1 | 2/2009 | Zollner |
| 2009/0060967 A1 | 3/2009 | Kenichi |
| 2009/0270577 A1 | 10/2009 | Beyers |
| 2010/0010112 A1 | 1/2010 | Prenzel |
| 2010/0137524 A1 | 6/2010 | Grittner |
| 2010/0310857 A1 | 12/2010 | Naito |
| 2011/0076489 A1 | 3/2011 | Nonaka |
| 2011/0129661 A1 | 6/2011 | Tsubaki |
| 2011/0151249 A1 | 6/2011 | Yamanaka |
| 2011/0165402 A1 | 7/2011 | Zollner |
| 2011/0195181 A1 | 8/2011 | Hua |
| 2011/0274843 A1 | 11/2011 | Grittner |
| 2011/0281964 A1 | 11/2011 | Zmarsly |
| 2012/0029105 A1 | 2/2012 | Czerwonatis |
| 2013/0004694 A1 | 1/2013 | Hitschmann |
| 2014/0142292 A1 | 5/2014 | Shimada |
| 2014/0154485 A1 | 6/2014 | Traser |

(Continued)

FOREIGN PATENT DOCUMENTS

| CN | 101805433 | 8/2010 |
| CN | 102836516 | 12/2012 |

(Continued)

OTHER PUBLICATIONS

Crowley, "A Three-Dimensional Approach to Solubility", Journal of Paint Technology, May 1996, vol. 38, No. 496, pp. 269-280.

(Continued)

*Primary Examiner* — Chinessa T. Golden
(74) *Attorney, Agent, or Firm* — Philip P. Soo; Jean A. Lown

(57) ABSTRACT

The present disclosure relates to a pressure sensitive adhesive assembly comprising at least a first pressure sensitive adhesive layer comprising a hollow non-porous particulate filler material, wherein the surface of the hollow non-porous particulate filler material is provided with a hydrophobic surface modification. The present disclosure also relates to a method of manufacturing such a pressure sensitive adhesive assembly.

10 Claims, No Drawings

(56) References Cited

U.S. PATENT DOCUMENTS

2014/0367040 A1  12/2014  Traser
2015/0307751 A1  10/2015  Eckhardt
2015/0368523 A1* 12/2015  Bae .................... C09D 151/04
                                                          428/355 BL

FOREIGN PATENT DOCUMENTS

| DE | 202009013255 U1 | 3/2010 |
|----|----|----|
| EP | 0257984 | 3/1988 |
| EP | 0259094 | 3/1988 |
| EP | 0324242 | 7/1989 |
| EP | 0324243 | 7/1989 |
| EP | 0728166 | 8/1996 |
| EP | 0752435 | 1/1997 |
| EP | 0963421 | 12/1999 |
| EP | 2572803 | 3/2013 |
| EP | 2573149 | 3/2013 |
| EP | 2573150 | 3/2013 |
| EP | 2727923 | 5/2014 |
| FR | 2744115 | 8/1997 |
| JP | 05070403 | 3/1993 |
| JP | 05070404 | 3/1993 |
| JP | H07-003222 | 1/1995 |
| JP | H07-090028 | 4/1995 |
| WO | WO 2005/017060 | 2/2005 |
| WO | WO 2013/002346 | 1/2013 |

OTHER PUBLICATIONS

Mutua, "Surface Modification of Hollow Glass Microspheres", Materials Sciences and Applications, Dec. 1, 2012, vol. 3, No. 12, pp. 856-860.
Sward, Chapter 2.7, 'Solvents', by W. H. Ellis, "Paint Testing Manual: Physical and Chemical Examination of Paints, Varnishes, Lacquers, and Colors", 13th edition, American Society for Testing and Materials, Philadelphia, Pennsylvania, (1972), pp. 130-149.
European Search Report for EP Application No. 13168253.6, dated Oct. 16, 2013, 7 pages.
International Search Report for PCT International Application No. PCT/US2014/037771, dated Aug. 6, 2014, 4 pages.

* cited by examiner

PRESSURE SENSITIVE ADHESIVE ASSEMBLY COMPRISING FILLER MATERIAL

CROSS REFERENCE TO RELATED APPLICATIONS

This application is a national stage filing under 35 U.S.C. 371 of PCT/US2014/037771, filed May 13, 2014, which claims priority to EP Application No. 13168253.6, filed May 17, 2013, the disclosure of which is incorporated by reference in its/their entirety herein.

TECHNICAL FIELD

The present disclosure relates generally to the field of adhesives, more specifically to the field of pressure sensitive adhesive (PSA) assemblies having at least a first pressure sensitive adhesive layer comprising a hollow non-porous particulate filler material. The present disclosure also relates to a method of manufacturing such pressure sensitive adhesive assemblies and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives. Pressure sensitive adhesives (PSAs) are well known to one of ordinary skill in the art to possess certain properties including the following: (1) aggressive and permanent tack, (2) adherence with no more than finger pressure, (3) sufficient ability to hold onto an adhered, and (4) sufficient cohesive strength. As applications for pressure-sensitive adhesives have increased substantially in recent years, performance requirements have become increasingly demanding.

Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are various (meth)acrylate based copolymers, natural rubber, synthetic rubbers, and silicones.

EP 0 728 166 B2 describes an acrylic-based pressure sensitive adhesive film comprising inorganic filler materials like fumed silica micro particles. These particles are described to fulfill different functions in the adhesive tape such as e.g. improved physical characteristics of the tape. Moreover, fumed silica is a less expensive ingredient compared to the organic polymers used in the adhesive tape, in consequence of which the costs of such an adhesive tape can be reduced by the introduction of such inorganic filler materials. Furthermore, the specific weight of the pressure sensitive adhesive film is reduced by the filler due to the low density of fumed silica when compared to the polymer matrix.

Besides fumed silica particles, also other filler materials have been used in pressure sensitive adhesive films known in the art. EP 0 963 421 B1 describes the use of glass beads or glass bubbles as well as glass or ceramic fibers as filler materials in order to reduce the weight or the costs of the adhesive composition, to adjust its viscosity and to provide additional reinforcement. The use of hollow glass balloons in a pressure sensitive adhesive tape is also described in US 2011/0129661 as allegedly providing high adhesion reliability. The use of expanded perlite as a porous inorganic filler material for pressure sensitive adhesive tapes has been described in EP-A1-2573149 and EP-A1-2573150. Due to its open and porous nature, the use of expanded perlite as a filler material does not allow for significant density reduction of the corresponding pressure sensitive adhesive tape, and does therefore not permit the production cost reduction as provided e.g. by glass beads or glass bubbles.

Moreover, the pressure sensitive adhesive materials known from the prior art do not often provide sufficient tack to various types of substrate, including the so-called LSE, MSE and HSE substrates, i.e. substrates having respectively a low surface energy, a medium surface energy and a high surface energy. In particular, the peel force or shear resistance on these challenging-to-bond substrates, particularly the LSE and MSE substrates, do not often fulfill the requirements, especially under environmental stress like altering temperatures and humidity.

This deficiency may partly be overcome by the addition of higher amounts of tackifiers. However, the excessive use of tackifiers may often detrimentally affect critical characteristics of pressure sensitive adhesives such as e.g. shear resistance and cohesive strength, and may raise the glass transition temperature of the corresponding adhesive. Furthermore, tackifiers may migrate into the substrate to which the adhesive tape is bonded and may lead to an undesired color change or stability reduction.

Without contesting the technical advantages associated with the pressure sensitive adhesive films known in the art, there is still a need for a cost-effective pressure sensitive adhesive assembly having improved and versatile adhesion characteristics, in particular with respect to peel forces and shear resistance on various types of difficult to adhere surfaces, such as in particular LSE and MSE substrates.

Other advantages of the multilayer pressure sensitive adhesive (PSA) assembly and methods of the disclosure will be apparent from the following description.

SUMMARY

According to one aspect, the present disclosure relates to a pressure sensitive adhesive assembly comprising at least a first pressure sensitive adhesive layer comprising a hollow non-porous particulate filler material, wherein the surface of the hollow non-porous particulate filler material is provided with a hydrophobic surface modification.

According to another aspect, the present disclosure is directed to a method of manufacturing a pressure sensitive adhesive assembly comprising at least a first pressure sensitive adhesive layer, the process comprising the steps of:
  a) providing a precursor composition of at least a first pressure sensitive adhesive layer; and
  b) incorporating a hollow non-porous particulate filler material into the precursor composition of at least a first pressure sensitive adhesive layer, wherein the surface of the hollow non-porous particulate filler material is provided with a hydrophobic surface modification.

According to still another aspect, the present disclosure relates to the use of a pressure sensitive adhesive assembly as above-described for the bonding to a low surface energy substrate, a medium surface energy substrate and/or a high surface energy substrate.

DETAILED DESCRIPTION

According to a first aspect, the present disclosure relates to a pressure sensitive adhesive assembly comprising at least a first pressure sensitive adhesive layer comprising a hollow non-porous particulate filler material, wherein the surface of the hollow non-porous particulate filler material is provided with a hydrophobic surface modification.

It has surprisingly been found that a pressure sensitive adhesive assembly comprising a pressure sensitive adhesive layer comprising a hollow non-porous particulate filler material, the surface of which is provided with a hydrophobic surface modification, combines high peel forces with high shear force resistance on various types of substrates. In particular, such advantageous properties may be obtained on substrates as diverse as low surface energy, medium surface energy and/or high surface energy substrates. This is particularly surprising finding as LSE, MSE and HSE substrates typically exhibit completely different surface chemistry and energy.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE), and blends of polypropylene (e.g. PP/EPDM, TPO). In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

In the context of the present disclosure, the expression "high surface energy substrates" is meant to refer to those substrates having a surface energy of more than 350 dynes per centimeter, typically more than 400 dynes per centimeter, and more typically to those substrates having a surface energy comprised between 400 and 1100 dynes per centimeter. Included among such materials are metal substrates (e.g. aluminum, stainless steel), and glass.

The surface energy is typically determined from contact angle measurements as described, for example, in ASTM D7490-08.

In the context of the present disclosure, the expression "hydrophobic surface modification" is meant to express that the surface of the hollow non-porous particulate filler material, after suitable surface modification, has little or no affinity for polar substances, in particular water.

The multilayer pressure sensitive adhesive assembly according to the disclosure may find a particular use for adhering e.g. automotive body side mouldings, weather strips, road signs, commercial signs, constructions, electrical cabinets, shell moulds, machine parts, junction boxes or backsheet solutions for photovoltaic modules. The multilayer pressure sensitive adhesive assembly according to the disclosure is particularly suited for bonding to low energy surfaces, such as polyolefin surfaces and clear coat surfaces. More particularly, the multilayer PSA assembly disclosed herein may be advantageously bonded to automotive clear coat surfaces.

The multilayer pressure sensitive adhesive assembly according to the disclosure comprises a hollow non-porous particulate filler material, wherein the surface of the hollow non-porous particulate filler material is provided with a hydrophobic surface modification.

The use of hollow non-porous particulate filler material comprised in the at least first pressure sensitive adhesive layer of the pressure sensitive adhesive assembly allows producing a cost-effective pressure sensitive adhesive assembly by reducing the overall weight/density of the pressure sensitive adhesive assembly and by reducing the consumption of the precursor composition used to form the at least first pressure sensitive adhesive layer of the pressure sensitive adhesive assembly.

Without wishing to be bound by theory, it is believed that the non-porous particulate material does not permit the precursor composition of the at least first pressure sensitive adhesive layer to even partially fill-up the microvoids created by the particulate filler material in the at least first pressure sensitive adhesive layer, by e.g. capillarity, adsorption or absorption.

Suitable hollow non-porous particulate filler material for use herein may be easily identified by those skilled in the art in the light of the present disclosure. Exemplary hollow non-porous particulate filler materials for use herein include, but are not limited to those selected from the group consisting of hollow glass microspheres, hollow inorganic beads, hollow inorganic particles or nanoparticles, hollow silica particles or nanoparticles, hollow carbide particles (e.g. silicon carbide particles, boron carbide particles), hollow nitride particles (e.g. carbon nitride particles, aluminum nitride particles, silicon nitride particles, boron nitride particles), hollow polymeric particles, hollow glass balloons, hollow aluminum balloons, and any combination or mixtures thereof.

Advantageously, the hollow non-porous particulate filler material for use herein comprises (or consists of) inorganic material. Advantageously still, the hollow non-porous particulate filler material for use herein is a closed-cell type particulate filler material.

In a particular aspect, the hollow non-porous particulate filler material for use herein is selected from the group consisting of hollow glass microspheres, hollow ceramic particles, hollow glass balloons, hollow inorganic beads, and any combinations or mixtures thereof.

In a preferred aspect of the present disclosure, the hollow non-porous particulate filler material for use herein consists of hollow glass microspheres.

Suitable hollow non-porous particulate filler materials for use herein are commercially available from various filler material suppliers. Hollow glass microspheres for use herein are for example commercially available from 3M, USA under commercial name 3M Glass Bubbles.

Suitable hollow non-porous particulate filler materials for use herein may have various particle sizes, particle shapes, particle size distributions, particle aspect ratios, and are not particularly limited. The selection of these technical characteristics will depend on the desired property required for the first pressure sensitive adhesive layer and/or the pressure sensitive adhesive assembly according to the present disclosure.

Suitable hollow non-porous particulate filler materials for use herein may typically have an average particle size comprised between 1 and 500 µm, between 10 and 300 µm, between 10 and 200 µm, between 30 and 150 µm, or even between 50 and 100 µm.

In a particular aspect, the hollow non-porous particulate filler material for use herein has as substantial spherical shape, including a true spherical and a distorted spherical shape. According to this particular aspect, the average particle size as described above would correspond to the average diameter of the hollow non-porous filler particles.

The amount of hollow non-porous particulate filler material which may be comprised in the at least first pressure sensitive adhesive layer of the pressure sensitive adhesive assembly is typically comprised between 1 and 30 wt %, between 2 and 20 wt %, or even between 2 and 15 wt %, by weight of the first pressure sensitive adhesive layer.

According to the present disclosure, the surface of the hollow non-porous particulate filler material is provided with a hydrophobic surface modification. Hydrophobic surface modification of particulate (filler) material is known to those skilled in the art. Any hydrophobic surface modification of particulate material commonly known in the art may be used in the context of the present disclosure.

Without wishing to be bound by theory, it is believed that the use of hollow non-porous particulate filler material provided with a hydrophobic surface modification leads to pressure sensitive adhesive assemblies with beneficial (micro-)mechanical properties, which correlate with their peel performance on various substrates. It is further believed that the hydrophobic surface modification of the hollow non-porous particulate filler material used herein strongly influences the interaction between the filler particle and the surrounding precursor composition of the first pressure sensitive adhesive layer, in particular a polymeric precursor composition.

Still without wishing to be bound by theory, it is believed that hollow non-porous particulate filler material provided with a hydrophobic surface modification leads to increased debonding between the precursor composition matrix and the surface of the filler particles. These weaker interactions between the precursor composition matrix and the filler particles, and therefore the improved deformability of the resulting pressure sensitive adhesive assembly, are believed to result in a better stress distribution/dissipation through the pressure sensitive adhesive assembly which in turn provides improved the peel performance on various substrate types, in particular on critical to adhere surfaces.

In a particular aspect, the hydrophobic surface modification is obtained substantially by chemical treatment, in particular chemical surface functionalization or chemical coating.

In one particular aspect of the pressure sensitive adhesive assembly according to the present disclosure, the hydrophobic surface modification is performed by surface functionalization according to techniques well known in the art.

According to one preferred aspect, the hydrophobic surface modification of the hollow non-porous particulate filler material is performed with non-polar groups, preferably alkyl groups through covalent bonds, more preferably through covalent siloxane bonds, between the non-polar groups (preferably, alkyl groups) and the surface of the hollow non-porous particulate filler material.

Preferably, the surface of the hollow non-porous particulate filler material is rendered hydrophobic by chemically reacting the hollow non-porous particulate filler material with a silane, more preferably a silane containing at least one hydrolysable functional group and at least one non-hydrolysable functional group.

Preferably still, the surface of the hollow non-porous particulate filler material is rendered hydrophobic by chemically reacting the hollow non-porous particulate filler material with an alkyl silane, more preferably an alkoxy silane, even more preferably an alkoxy silane containing at least one hydrolysable functional group and at least one non-hydrolysable functional group.

The alkoxy silane used for the hydrophobic surface modification of the hollow non-porous particulate filler material may typically have the following formula:

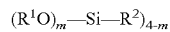

$(R^1O)_m\text{—}Si\text{—}R^2)_{4-m}$ wherein:
$R^1$ is independently an alkyl group, preferably comprising 1 to 6, more preferably 1 to 4 carbon atoms, even more preferably $R^1$ is independently selected from the group consisting of methyl, ethyl, propyl and butyl, more preferably from the group consisting of methyl and ethyl;

m=1 to 3, preferably m=2 or 3; more preferably m=3;

$R^2$ is independently an hydrophobic (non-hydrolyzable) moiety, preferably selected from the group consisting of saturated, unsaturated, substituted or un-substituted alkyls, ethers, thioethers, esters, amides, amines, carbamates, urethanes, polyolefins, and any combinations thereof, preferably comprising from 1 to 100, more preferably from 1 to 50, even more preferably from 1 to 30 carbon atoms, still more preferably from 1 to 25 carbon atoms; yet more preferably $R^2$ is independently selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and fluorinated derivatives thereof, tridecafluroro-1,2,2,2-tetrahydrooctyl; yet more preferably $R^2$ is independently selected from the group consisting of methyl, n-octyl, hexadecyl and tridecafluroro-1,2,2,2-tetrahydrooctyl.

According to the particular aspect wherein the surface of the hollow non-porous particulate filler material is rendered hydrophobic by chemically reacting the hollow non-porous particulate filler material with a silane, preferably an organosilane, more preferably a silane containing at least one hydrolysable functional group and at least one non-hydrolysable functional group, the hollow non-porous particulate filler material, in particular the hollow glass microspheres, may be advantageously pre-treated with hydrogen peroxide.

According to another preferred aspect, the hydrophobic surface modification of the hollow non-porous particulate filler material is performed by applying a hydrophobic coating. Suitable techniques for hydrophobically coating hollow non-porous particulate fillers are commonly known to those skilled in the art.

According to a particular aspect, the hydrophobic coating is typically applied by contacting the hollow non-porous particulate filler material with a liquid medium selected from the group of emulsions, suspensions or solutions, and comprising a component preferably selected from the group consisting of alkoxy silanes, hydrocarbon waxes, polyethylene waxes, fluorinated hydrocarbon waxes, silicone, and any combinations or mixtures thereof.

Suitable liquid aqueous emulsion for hydrophobically coating hollow non-porous particulate fillers will be easily identified by those skilled in the art in the light of the present disclosure. Exemplary liquid aqueous emulsions for hydrophobically coating hollow non-porous particulate fillers are commercially available from Protex International under trade name Synthron-Pel AGE or Prox-Amine NP 912 GL.

The pressure sensitive adhesive assembly according to the present disclosure may have a design or configuration of any suitable kind, depending on its ultimate application and the desired properties, and provided it comprises at least a first pressure sensitive adhesive layer.

The pressure sensitive adhesive assembly of the present disclosure may take the form of a single layer construction, and consist essentially of the first pressure sensitive adhesive layer. Such a single layer assembly can be advantageously used as double-sided adhesive tape.

According to an alternative aspect, the pressure sensitive adhesive assembly of the present disclosure may take the form of a multilayer construction, and may comprise e.g. two or more superimposed layers, i.e. the first pressure sensitive adhesive layer and adjacent layers such as e.g. a backing layer and/or further pressure sensitive adhesive layers. Such adhesive multilayer constructions or tapes may be advantageously used as a dual-layer adhesive tape to adhere two objects to one another. In that context, suitable backing layers for use herein may or may not exhibit at least partial pressure sensitive adhesive characteristics.

In executions where a backing layer is also present, such a pressure sensitive adhesive assembly reflects a three-layer design, in which the backing layer may be sandwiched between e.g. two pressure sensitive adhesive layers.

Regarding multilayer pressure sensitive adhesive assemblies, the present disclosure is not limited to the above described designs. As a further alternative execution, the pressure sensitive adhesive assembly may comprise at least one intermediate layer between a backing layer and pressure sensitive adhesive layer(s). These further internal intermediate layers, as well as the backing layer, may exhibit advantageous mechanical properties, such as e.g. increasing the tear resistance of the multilayer pressure sensitive adhesive assembly or optical functionalities such as e.g. light transmission or reflection, colouring and labeling.

In a particular aspect, the intermediate layer comprises a polymer chosen from the group consisting of polyacrylates, polyurethanes, polyolefins, polystyrene, polyamides, natural rubbers, synthetic rubbers, polyvinylpyrrolidone, and any combinations or mixtures thereof.

However, it is also possible that the intermediate layer(s) is chosen from a pressure sensitive adhesive composition as described in this disclosure for the PSA layer. The formulation of the intermediate layer(s) may be identical or different compared to the pressure sensitive adhesive layer.

Suitable backing layers can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like.

In a particular aspect, the pressure sensitive adhesive assembly of the present disclosure is in the form of a multilayer pressure sensitive adhesive assembly further comprising a second pressure sensitive adhesive layer adjacent to the first pressure sensitive adhesive layer.

According to the particular execution, wherein the multilayer pressure sensitive adhesive assembly further comprises a second pressure sensitive adhesive layer adjacent to the first pressure sensitive adhesive layer, the multilayer pressure sensitive adhesive assembly of the present disclosure may advantageously take the form of skin/core type multilayer pressure sensitive adhesive assembly, wherein the first pressure sensitive adhesive layer is the core layer of the multilayer pressure sensitive adhesive assembly and the second pressure sensitive adhesive layer is the skin layer of the multilayer pressure sensitive adhesive assembly. Skin/core type of multilayer pressure sensitive adhesive assemblies are well know to those skilled in the art.

According to a particular aspect, the pressure sensitive adhesive assembly according to the present disclosure comprises a first pressure sensitive adhesive layer which takes the form of a polymeric foam layer.

In the context of the present disclosure, the term "polymeric foam" is meant to designate a material based on a polymer and which material comprises voids, typically in an amount of at least 5% by volume, typically from 10% to 55% by volume or from 10% to 45% by volume. The voids may be obtained by any of the known methods such as cells formed by gas. Alternatively, the voids may result from the incorporation of hollow fillers, such as hollow polymeric particles, hollow glass microspheres or hollow ceramic microspheres.

A polymeric foam layer for use herein has for example a thickness comprised between 100 and 6000 μm, between 200 and 4000 μm, between 500 and 2000 μm, or even between 800 and 1500 μm. As will be apparent to those skilled in the art, in the light of the present description, the preferred thickness of the polymeric foam layer will be dependent on the intended application.

A polymeric foam layer typically has a density comprised between 0.45 g/cm$^3$ and 1.5 g/cm$^3$, between 0.45 g/cm$^3$ and 1.10 g/cm$^3$, between 0.50 g/cm$^3$ and 0.95 g/cm$^3$, between 0.60 g/cm$^3$ and 0.95 g/cm$^3$, or even between 0.70 g/cm$^3$ and 0.95 g/cm$^3$. This density is achieved by including voids or cells. Typically, the polymeric foam layer will comprise at least 5% of voids by volume and for example between 15 and 45%, or between 20% and 45% by volume.

The voids or cells in the polymeric foam layer can be created in any of the known manners described in the art and include the use of a gas or blowing agent and/or including hollow particles into the composition for the polymeric foam layer. For example, according to one method to create a polymeric foam described in U.S. Pat. No. 4,415,615, an acrylic foam can be obtained by the steps of (i) frothing a composition containing the acrylate monomers and optional comonomers, (ii) coating the froth on a backing and (iii) polymerizing the frothed composition. It is also possible to coat the unfrothed composition of the acrylate monomers and optional comonomers to the backing and to then simultaneously foam and polymerize that composition. Frothing of the composition may be accomplished by whipping a gas into the polymerizable composition. Preferred gasses for this purpose are inert gasses such as nitrogen and carbon dioxide, particularly if the polymerization is photoinitiated.

A skin/core type multilayer pressure sensitive adhesive assembly, wherein the first pressure sensitive adhesive layer is the core layer of the multilayer pressure sensitive adhesive assembly and the second pressure sensitive adhesive layer is the skin layer of the multilayer pressure sensitive adhesive assembly, may advantageously comprise a core layer (i.e. the first pressure sensitive adhesive layer) in the form of a polymeric foam layer. This particular execution is commonly referred to as a dual layer polymeric foam tape assembly.

Multilayer pressure sensitive adhesive assemblies according to the present disclosure, and in particular dual layer polymeric foam tape assemblies, are particularly advantageous when compared to single-layer pressure sensitive adhesives, in that adhesion (quick adhesion) can be adjusted by the formulation of the second pressure sensitive adhesive layer (also commonly referred to as the skin layer), while other properties/requirements of the overall assembly such as application issues, deforming issues and energy distribution may be addressed by appropriate formulation of the polymeric foam layer (also commonly referred to as the core layer). In some aspects, the multilayer pressure sensitive adhesive assemblies as disclosed herein are smooth, homogenous and consist of layers which are chemically bond to each other, without any delamination occurring.

In some aspects, it may be advantageous for the multilayer pressure sensitive adhesive assemblies of the present disclosure to further comprise a third pressure sensitive adhesive layer which is preferably adjacent to the first pressure sensitive adhesive layer in the side of the first pressure sensitive adhesive layer which is opposed to the side of the first pressure sensitive adhesive layer adjacent to the second pressure sensitive adhesive layer, and thereby forming a three-layered multilayer pressure sensitive adhesive assembly.

Three-layered multilayer pressure sensitive adhesive assemblies according to one aspect of the disclosure, may advantageously take the form of a skin/core/skin multilayer pressure sensitive adhesive assembly, wherein the first pressure sensitive adhesive layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

The first pressure sensitive adhesive layer and/or the second pressure sensitive adhesive layer and/or the third pressure sensitive adhesive layer may have any composition commonly known in the art. As such, the composition of these various layers for use in the multilayer pressure sensitive adhesive assemblies of the present disclosure is not particularly limited.

In a particular aspect, the first pressure sensitive adhesive layer and/or the second pressure sensitive adhesive layer and/or the third pressure sensitive adhesive layer comprise a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

In a typical aspect, the first pressure sensitive adhesive layer and/or the second pressure sensitive adhesive layer and/or the third pressure sensitive adhesive layer comprise a polymer base material selected from the group consisting of polyacrylates, polyurethanes, and any combinations, copolymers or mixtures thereof. According to another typical aspect, the first pressure sensitive adhesive layer and/or the second pressure sensitive adhesive layer and/or the third pressure sensitive adhesive layer comprise a polymer base material selected from the group consisting of polyacrylates, and any combinations, copolymers or mixtures thereof.

According to a preferred aspect of the pressure sensitive adhesive assemblies of the present disclosure, the first pressure sensitive adhesive layer and/or the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

As used herein, the term "alkyl (meth)acrylate" and "alkyl (meth)acrylate ester" are used interchangeably. The term "(meth)acrylate" refers to an acrylate, methacrylate, or both. The term "(meth)acrylic" refers to methacrylic, acrylic, or both. A (meth)acrylic-based" material refers to one prepared from one or more monomers having a (meth)acryloyl group, which is a group of formula $CH_2=C(R)-(CO)-$ where R is hydrogen or methyl.

The term "alkyl" refers to a monovalent group which is a saturated hydrocarbon. The alkyl can be linear, branched, cyclic, or combinations thereof and typically has 1 to 32 carbon atoms. In some embodiments, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl and 2-propylheptyl.

The terms "glass transition temperature" and "Tg" are used interchangeably and refer to the glass transition temperature of a material or a mixture. Unless otherwise indicated, glass transition temperature values are determined by Differential Scanning Calorimetry (DSC).

According to a preferred aspect of the pressure sensitive adhesive assemblies of the present disclosure, the first pressure sensitive adhesive layer and/or the second pressure sensitive adhesive layer and/or the third pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth) acrylate, isopropyl (meth)acrylate, n-butyl acrylate, isobutyl acrylate, tert-butyl (meth)acrylate, n-pentyl (meth) acrylate, iso-pentyl (meth)acrylate, n-hexyl (meth)acrylate, iso-hexyl (meth)acrylate, cyclohexyl (meth)acrylate, phenyl (meth)acrylate, octyl (meth)acrylate, iso-octyl (meth)acrylate, 2-octyl(meth)acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

In a more preferred aspect, the linear or branched alkyl (meth)acrylate ester for use herein is selected from the group consisting of iso-octyl (meth)acrylate, 2-ethylhexyl (meth) acrylate, 2-propylheptyl (meth) acrylate, 2-octyl (meth)acrylate, butyl acrylate, and any combinations or mixtures thereof; more preferably from the group consisting of iso-octyl acrylate, 2-ethylhexyl acrylate, 2-octyl acrylate and 2-propylheptyl acrylate.

According to an alternative aspect, the linear or branched alkyl (meth)acrylate ester for use herein is selected to comprise 2-octyl(meth)acrylate. Polymer base material derived from 2-octyl (meth)acrylate provides comparable adhesive properties when compared with other isomers of octyl (meth)acrylate, such as n-octyl and isooctyl. Further, the pressure sensitive adhesive compositions have lower inherent and solution viscosities when compared to adhesive compositions derived from other octyl isomers, such as isooctyl acrylate, at the same concentrations, and under the same polymerization conditions.

The 2-octyl (meth)acrylate may be prepared by conventional techniques from 2-octanol and (meth)acryloyl derivates such as esters, acids and acyl halides. The 2-octanol may be prepared by treatment of ricinoleic acid, derived from castor oil, (or ester or acyl halide thereof) with sodium hydroxide, followed by distillation from the co-product sebacic acid.

It is however preferred that the 2-octyl(meth)acrylate monomer for use herein is at least partly, preferably completely (i.e. 100 wt.-%) derived from biological material, more preferably from a plant material. This may advantageously be used to provide adhesive films/tapes which are at least partly derived from "green" sources, which is ecologically more sustainable and also reduces the dependency on mineral oil and the price development.

In the context of the present disclosure, the term "derived from biological material" is meant to express that from a certain chemical ingredient, at least a part of its chemical structure comes from biological materials, preferably at least 50 wt.-% of its structure. This definition is in principle the same as for bio-diesel fuel, in which usually only the fatty acid part originates from biological sources whereas the methanol may also be derived from fossil material like coal or mineral oil.

(Meth)acrylic-based polymeric materials included in known pressure-sensitive adhesives are often prepared from one or more non-polar acrylate monomers with a relatively low glass transition temperature (Tg) (i.e., the Tg of a monomer is measured as a homopolymer prepared from the monomer) plus various optional monomers such as one or more polar monomers. The polar monomers are often selected to have an acidic group, a hydroxyl group, or a nitrogen-containing group.

Some widely used non-polar acrylate monomers in conventional (meth)acrylic-based elastomeric materials are alkyl (meth)acrylates such as 2-ethylhexyl acrylate (2-EHA) and isooctyl acrylate (IOA).

According to a particular aspect of the pressure sensitive adhesive assemblies of the present disclosure, the first pressure sensitive adhesive layer and/or the second pressure sensitive adhesive layer and/or the third pressure sensitive adhesive layer, and in particular the second pressure sensitive adhesive layer and/or the third pressure sensitive adhesive layer (common referred to as skin layers), comprises a polymer base material further comprising a polar comonomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof. Other useful polar comonomers include, but are not limited to, N-substituted acrylamides, acrylonitrile, methacrylonitrile, hydroxyalkyl acrylates, cyanoethyl acrylate, maleic anhydride, N-vinyl-2-pyrrolidone, N-vinyl-caprolactam and any combinations or mixtures thereof.

According to a typical aspect of the present disclosure, the first pressure sensitive adhesive layer and/or the second pressure sensitive adhesive layer and/or the third pressure sensitive adhesive layer for use in the pressure sensitive adhesive assembly comprises a pressure sensitive adhesive composition comprising a reaction product of a polymerizable material comprising:

(a) a linear or branched alkyl (meth)acrylate ester as main monomer, wherein the main monomer is preferably selected from the group consisting of iso-octyl (meth)acrylate, 2-ethylhexyl (meth)acrylate, 2-propylheptyl (meth)acrylate, butyl acrylate; and optionally (b) a second monomer having an ethylenically unsaturated group, preferably a reinforcing monoethylenically-unsaturated monomers which is copolymerizable with the acrylate main monomer.

In some exemplary aspects, the polymerizable material used for producing the first pressure sensitive adhesive layer and/or the second pressure sensitive adhesive layer and/or the third pressure sensitive adhesive layer of the pressure sensitive adhesive assembly comprises (at least one) second monomer having an ethylenically unsaturated group. Any suitable second monomer having an ethylenically unsaturated group may be used to prepare the polymerizable material used for producing the first pressure sensitive adhesive layer and/or the second pressure sensitive adhesive layer and/or the third pressure sensitive adhesive layer of the PSA assembly. Suitable second monomer having an ethylenically unsaturated group for use herein will be easily identified by those skilled in the art, in the light of the present description.

Exemplary second monomers having an ethylenically unsaturated group for use herein include those selected from the group consisting of polar and non-polar alkyl (meth)acrylate esters, polar monomers, non-polar vinyl monomers, and any combinations or mixtures thereof.

According to a typical aspect, the second monomer having an ethylenically unsaturated group comprises an alkyl (meth)acrylate ester, preferably having an alkyl group comprising from 1 to 32, from 1 to 20, or even from 1 to 15 carbon atoms.

In a more typical aspect, the polymerizable material further comprises a second non-polar monomer having an ethylenically unsaturated group. Any non-polar monomer with an ethylenically unsaturated group can be used as the second monomer to prepare the polymerizable material used for producing the first pressure sensitive adhesive layer and/or the second pressure sensitive adhesive layer and/or the third pressure sensitive adhesive layer of the PSA assembly. Suitable non-polar monomers having an ethylenically unsaturated group for use herein will be easily identified by those skilled in the art in the light of the present description.

Suitable second non-polar monomers having an ethylenically unsaturated group include, but are not limited to, non-polar alkyl (meth)acrylate esters. In particular, the second monomer comprises a non-polar alkyl (meth)acrylate ester having an alkyl group comprising from 1 to 32, from 1 to 20, from 1 to 15, or even from 1 to 13 carbon atoms.

Particular non-polar alkyl (meth)acrylate esters with an alkyl group having from 1 to 30 carbon atoms for use herein include, but are not limited to, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, iso-pentyl (meth)acrylate (i.e., iso-amyl (meth)acrylate), 3-pentyl (meth)acrylate, 2-methyl-1-butyl (meth)acrylate, 3-methyl-1-butyl (meth)acrylate, stearyl (meth)acrylate, phenyl (meth)acrylate, n-hexyl (meth)acrylate, iso-hexyl (meth) acrylate, cyclohexyl (meth)acrylate, 2-methyl-1-pentyl (meth)acrylate, 3-methyl-1-pentyl (meth)acrylate, 4-methyl-2-pentyl (meth)acrylate, 2-ethyl-1-butyl (meth)acrylate, 2-methy-1-hexyl (meth)acrylate, 3,5,5-trimethyl-1-hexyl (meth)acrylate, cyclohexyl (meth)acrylate, 3-heptyl (meth) acrylate, benzyl (meth)acrylate, n-octyl (meth)acrylate, iso-octyl (meth)acrylate, 2-octyl (meth)acrylate, 2-ethyl-1-hexyl (meth)acrylate, n-decyl (meth)acrylate, iso-decyl (meth)acrylate, isobornyl (meth)acrylate, 2-propylheptyl (meth)acrylate, isononyl (meth)acrylate, isophoryl (meth) acrylate, n-dodecyl (meth)acrylate (i.e., lauryl (meth)acrylate), n-tridecyl (meth)acrylate, iso-tridecyl (meth)acrylate, 3,7-dimethyl-octyl (meth)acrylate, and any combinations or mixtures thereof.

Other suitable alkyl (meth)acrylate esters for use herein include those with an alkyl group having at least 14 carbon atoms but that are linear or that have a single branching point. Examples include, but are not limited to, 1-octadecyl (meth)acrylate, 17-methyl-1-heptadecyl (meth)acrylate, and 1-tetradecyl (meth)acrylate.

Still other suitable non-polar (meth)acrylate esters for use herein are aryl (meth)acrylates such as, for example, phenyl (meth)acrylate or benzyl (meth)acrylate; alkenyl (meth) acrylates such as, for example, 3,7-dimethyl-6-octenyl-1 (meth)acrylate and allyl (meth)acrylate; and aryl substituted alkyl (meth)acrylates or aryloxy substituted alkyl (meth) acrylates such as, for example, 2-biphenylhexyl (meth) acrylate, benzyl (meth)acrylate, and 2-phenoxy ethyl (meth) acrylate.

In some typical aspects, it might be advantageous for the second non-polar monomer for use in the PSA assembly to have a relatively high Tg when formed into a homopolymer (i.e., a polymer prepared using a single polymerizable material), as these monomers have the ability to modulate the Tg of the polymerizable material so as to provide enhanced adhesive strength. When formed into a homopolymer, these monomers typically have a glass transition temperature (Tg) of at least 20° C., or at least 25° C., or at least 30° C., or at least 40° C., or even at least 50° C. However, the disclosure is not that limited, as a second non-polar monomer for use in the multilayer PSA assembly may also have a relatively low Tg when formed into a homopolymer, i.e. a Tg of below 20° C.

According to a particular aspect, the second non-polar monomer is for example selected from the group consisting of methyl (meth)acrylate, tert-butyl (meth)acrylate, ethyl (meth)acrylate, n-propyl (meth)acrylate, isopropyl (meth) acrylate, iso-butyl (meth)acrylate, stearyl (meth)acrylate, phenyl (meth)acrylate, cyclohexyl (meth)acrylate, isobornyl (meth)acrylate, benzyl (meth)acrylate, isophoryl (meth) acrylate, and any combinations or mixtures thereof.

In a preferred aspect, the second non-polar monomer for use herein is selected from the group consisting of isobornyl (meth)acrylate, cyclohexyl (meth)acrylate, isophoryl (meth) acrylate, cyclohexyl (meth)acrylate, and any combinations or mixtures thereof. According to a particularly preferred aspect, the second monomer is selected to comprise isobornyl (meth)acrylate.

Further second monomers having an ethylenically unsaturated group for use herein may include a monomer with an acidic group and a single ethylenically unsaturated group (i.e., an acidic monomer). These monomers are typically polar or strongly polar. Polarity (i. e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269-280. The ethylenically unsaturated group can be a (meth)acryloyl group or a vinyl group (i.e., CH2=CH2— group) that is not a (meth) acryloyl group. Exemplary acidic monomers can have a carboxylic acid group, sulfonic acid group, phosphonic acid group, or salts thereof. Due to their availability, acidic monomers with carboxylic acid groups or salts thereof are often selected. If stronger acidic groups are desired, monomers with phosphonic acid, sulfonic acid groups, or salts thereof can be used. Examples of acidic monomers include, but are not limited to, (meth)acrylic acid, itaconic acid, fumaric acid, crotonic acid, citraconic acid, maleic acid, oleic acid, beta-carboxyethyl (meth)acrylate, 2-sulfoethyl methacrylate, styrene sulfonic acid, 2-acrylamido-2-methyl-propanesulfonic acid, vinylphosphonic acid, or mixtures thereof. Any suitable salt of an acidic group can be used. In many embodiments, the cation of the salt is an ion of an alkaline metal (e.g., sodium, potassium, or lithium ion), an ion of an alkaline earth (e.g., calcium, magnesium, or strontium ion), an ammonium ion, or an ammonium ion substituted with one or more alkyl or aryl groups.

For differentiation of polarity, some examples will be given. In particular useful representatives of strongly polar monomers are acrylic acid, methacrylic acid, itaconic acid, hydroxyalkyl acrylates, acrylamides and substituted acrylamides while, for example N-vinyl pyrrolidone, N-vinyl caprolactam, acrylonitrile, vinylchloride, diallyl phthalate and N,N-dialkylamino (meth)acrylates are typical examples of moderately polar monomers. Further examples for polar monomers include cyano acrylate, fumaric acid, crotonic acid, citronic acid, maleic acid, β-carboxyethyl acrylate or sulfoethyl methacrylate. The alkyl (meth)acrylate monomers enumerated above are typical examples of relatively poorly polar monomers. These examples are given for illustrative reasons only and are not to be understood as limiting. Among the group of polar monomers for use as the second monomer, N-vinyl caprolactam is particularly preferred.

For the pressure sensitive assemblies according to the present disclosure, the content of strongly polar acrylates is typically limited in order to provide good adhesion to LSE (Low Surface Energy) surfaces. Hence, it is advantageous that the polymerizable material for the pressure sensitive adhesive layer(s) of the multilayer PSA assembly comprises up to 10 weight percent of the strongly polar acrylate based on a total weight of polymerizable material, or from 0.1 to 10 weight percent, from 0.5 to 10 weight percent, from 1.0 to 10 weight percent, from 2.0 to 8.0 weight percent, from 2.5 to 6.0 weight percent, or even from 3.0 to 6.0 weight percent, when the PSA assembly is in particular intended for adhesion to LSE substrates.

Other second monomers having an ethylenically unsaturated group suitable for use herein include those with a single ethylenically unsaturated group and a hydroxyl group. These monomers tend to be polar. The ethylenically unsaturated group can be a (meth)acryloyl group or a vinyl group (i.e., $CH_2=CH_2$— group). Exemplary monomers with a hydroxyl group include, but are not limited to, hydroxyalkyl (meth)acrylates (e.g., 2-hydroxyethyl acrylate or 3-hydroxypropyl acrylate), hydroxyalkyl (meth)acrylamides (e.g., 2-hydroxyethyl acrylamide or 3-hydroxypropyl acrylamide), and ethoxylated hydroxyethyl methacrylate (e.g., monomers commercially available from Sartomer under the trade designation CD570, CD571, CD572).

Still other suitable second monomers having an ethylenically unsaturated group are those with a single ethylenically unsaturated group and a nitrogen-containing group or a salt thereof. Most of these monomers tend to be polar. The ethylenically unsaturated group can be a (meth)acryloyl group or a vinyl group (i.e., $CH_2=CH_2$— group). Examples of the nitrogen-containing groups include, but at not limited to, secondary amido groups and tertiary amido groups. Exemplary polar monomers with secondary amido groups include, but are not limited to, N-alkyl (meth)acrylamides such as N-methyl acrylamide, N-ethyl acrylamide, N-isopropyl acrylamide, tert-octyl acrylamide, or N-octyl acrylamide. Exemplary polar monomers with a tertiary amido group include, but are not limited to, N-vinyl caprolactam, N-vinyl-2-pyrrolidone, acryloyl morpholine, and N,N-dialkyl acrylamides such as N,N-dimethyl acrylamide, N,N-diethyl acrylamide, N,N-dipropyl acrylamide, N,N-dibutyl acrylamide, and any combinations or mixtures thereof.

Still other suitable polar second monomers having an ethylenically unsaturated group for use herein include those with a single ethylenically unsaturated group and an ether group (i.e., a group containing at least one alkylene-oxyalkylene group of formula —R—O—R— where each R is an alkylene having 1 to 4 carbon atoms). These monomers tend to be polar. Exemplary monomers include, but are not limited to, alkoxylated alkyl (meth)acrylates such as ethoxyethoxyethyl acrylate, 2-methoxyethyl acrylate, and 2-ethoxyethyl acrylate; and a poly(alkylene oxide) acrylates such as poly(ethylene oxide) acrylates, and poly(propylene oxide) acrylates. The poly(alkylene oxide) acrylates are often referred to as poly(alkylene glycol) acrylates. These monomers can have any suitable end group such as a hydroxyl group or an alkoxy group. For example, when the end group is a methoxy group, the monomer can be referred to as methoxy poly(ethylene glycol) acrylate.

The various polar monomers may typically be added to increase adhesion of the pressure sensitive adhesive layer(s) of the PSA assembly to an adjacent layer such as a substrate or a backing layer, to enhance the cohesive strength of the polymerizable material, or both. Any of the polar monomers or salt thereof can be present in any suitable amounts. In some exemplary aspects, the polar monomers are present in amounts up to 15 weight percent based on a total weight of the polymerizable material used to produce the particular pressure-sensitive adhesive layer of the pressure sensitive adhesive assembly. Accordingly, in some exemplary aspects, the polar monomer, preferably a polar acrylate monomer, can be present in an amount in a range of from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer. In some other exemplary aspects, this amount is typically up to 10 weight percent or up to 5 weight percent. For example, the polar monomer can be present in an amount in a range of 0 to 15 weight percent, 0.5 to 15 weight percent, 1 to 15 weight percent, 0 to 10 weight percent, 0.5 to 10 weight percent, 1 to 10 weight percent, 0 to 5 weight percent, 0.5 to 5 weight percent, or 1 to 5 weight percent based on a total weight of the polymerizable material used to produce the particular pressure-sensitive adhesive layer of the pressure sensitive adhesive assembly.

In some aspects, the second monomer having an ethylenically unsaturated group for use herein is for example selected from the group consisting of methyl methacrylate, tert-butyl (meth)acrylate, ethyl (meth)acrylate, n-propyl (meth)acrylate, isopropyl (meth)acrylate, iso-butyl (meth) acrylate, stearyl (meth)acrylate, phenyl (meth)acrylate, cyclohexyl (meth)acrylate, isobornyl (meth)acrylate, benzyl (meth)acrylate, isophoryl (meth)acrylate, N-vinyl caprolactam, and any combinations or mixtures thereof.

More typically, the second monomer having an ethylenically unsaturated group for use herein is for example selected from the group consisting of isobornyl (meth) acrylate, cyclohexyl (meth)acrylate, isophoryl (meth)acrylate, cyclohexyl (meth)acrylate, N-vinyl caprolactam, and any combinations or mixtures thereof. Even more typically, the second monomer is selected from the group of isobornyl (meth)acrylate and N-vinyl caprolactam.

In one particularly preferred aspect, the second monomer having an ethylenically unsaturated group for use herein is selected to be isobornyl (meth)acrylate, preferably isobornyl acrylate.

In some exemplary aspects, the polymerizable material used for producing the particular pressure-sensitive adhesive layer of the PSA assembly, may comprise (at least one) further co-monomer. Any further co-monomer can be used to prepare the polymerizable material used for producing the particular pressure-sensitive adhesive layer of the PSA assembly. Suitable further co-monomer for use herein will be easily identified by those skilled in the art, in the light of the present description.

Exemplary further co-monomers for use herein include those described above with respect to the second monomer having an ethylenically unsaturated group. In a typical aspect, further co-monomers for use herein include those selected from the group consisting of non-polar alkyl (meth) acrylate esters, polar monomers, non-polar vinyl monomers, and any combinations or mixtures thereof. In another typical aspect, further co-monomers for use herein include those selected from the group consisting of non-polar alkyl (meth) acrylate esters, as described hereinabove.

In an advantageous aspect of the PSA assembly, the polymerizable material comprises a further co-monomer selected from the group of polar monomers, which preferably comprise an acidic group, a hydroxyl group, or a nitrogen-containing group, and wherein the acidic group is preferably a carboxyl group or a salt thereof.

In still another advantageous aspect, the further co-monomer comprises a polar monomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines, and any combinations or mixtures thereof. In a particularly advantageous aspect, the further co-monomer comprises acrylic acid.

In some aspects of the PSA assembly, the polymerizable material used to produce the particular pressure sensitive adhesive layer comprises from 50 to 99.5 weight percent, or from 60 to 90 weight percent of 2-propylheptyl acrylate as a first monomer and from 0.5 to 50 weight percent, from 1.0 to 50 weight percent, from 3.0 to 40 weight percent, from 5.0 to 35 weight percent, or even from 10 to 30 weight percent, of the second monomer having an ethylenically unsaturated group, based on the total weight of polymerizable material.

In some other aspects of the PSA assembly, the polymerizable material comprises at least 50 weight percent of a linear or branched alkyl (meth)acrylate ester as first/main monomer and up to 15 weight percent, or up to 10 weight percent of a polar monomer, preferably a polar acrylate, based on the total weight of polymerizable material.

In some other aspects of the PSA assembly, the polymerizable material comprises at least 0.1 weight percent, at least 0.5 weight percent, at least 1 weight percent, or at least 2 weight percent, or even at least 3 weight percent, of a polar monomer, preferably a polar acrylate, based on the total weight of polymerizable material.

According to an advantageous aspect of the pressure sensitive assembly of the present disclosure, the polymerizable material used to produce the particular pressure sensitive adhesive layer, in particular the second pressure sensitive adhesive layer and/or the third pressure sensitive layer, comprises:
a) from 50 to 99.5 weight percent, or from 60 to 90 weight percent, of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally
b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a polar monomer, preferably a polar acrylate; and optionally d) a tackifying resin, wherein the weight percentages are based on the total weight of polymerizable material.

According to still another advantageous aspect of the pressure sensitive assembly, the polymerizable material used to produce the particular pressure sensitive adhesive layer, in particular the second pressure sensitive adhesive layer and/or the third pressure sensitive layer, comprises:

a) of a linear or branched alkyl (meth)acrylate ester as first/main monomer, wherein the main monomer is preferably selected from the group consisting of iso-octyl (meth)acrylate, 2-ethylhexyl (meth)acrylate, 2-propylheptyl (meth)acrylate, butyl acrylate; optionally b) from 1.0 to 50 weight percent, from 3.0 to 40 weight percent, from 5.0 to 35 weight percent, or even from 10 to 30 weight percent, of the second monomer having an ethylenically unsaturated group, preferably a second non-polar monomer having an ethylenically unsaturated group; optionally c) from 0.1 to 15 weight percent, from 0.5 to 15 weight percent, from 1.0 to 10 weight percent, from 2.0 to 8.0 weight percent, from 2.5 to 6.0 weight percent, or even from 3.0 to 6.0 weight percent of a first polar monomer, preferably a polar acrylate; optionally d) a second polar monomer, preferably a polar non-acrylate monomer; and optionally e) a tackifying resin;

wherein the weight percentages are based on the total weight of polymerizable material.

According to still another advantageous aspect of the PSA assembly, the particular pressure-sensitive adhesive composition (i.e. polymerizable material) used to produce the first pressure sensitive adhesive layer and/or the second pressure sensitive adhesive layer and/or the third pressure sensitive adhesive layer further comprises a tackifying resin, typically in an amount from 3 to 50 parts, from 5 to 30 parts, or even from 8 to 25 parts, per 100 parts of the polymerizable material.

In some executions, one or more tackifiers, one or more plasticizers, or a mixture thereof can be combined with the polymerizable material. Tackifiers (i.e., tackifying agents or tackifying resins) and plasticizers (i.e., plasticizing agents) are often added to modulate the Tg, modulate the storage modulus, and to alter the tackiness of the pressure-sensitive adhesive.

Any tackifiers that are included in the particular pressure-sensitive adhesive compositions are typically selected to be miscible with the polymerizable material. Any tackifier typically included in conventional pressure-sensitive adhesive compositions may be used. Either solid or liquid tackifiers can be added. Solid tackifiers generally have a number average molecular weight (Mw) of 10,000 grams per mole or less and a softening point above about 70° C. Liquid tackifiers are viscous materials that have a softening point of about 0° C. to about 70° C.

Suitable tackifying resins include rosin resins such as rosin acids and their derivatives (e.g., rosin esters); terpene resins such as polyterpenes (e.g., alpha pinene-based resins, beta pinene-based resins, and limonene-based resins) and aromatic-modified polyterpene resins (e.g., phenol modified polyterpene resins); coumarone-indene resins; and petroleum-based hydrocarbon resins such as C5-based hydrocarbon resins, C9-based hydrocarbon resins, C5/C9-based hydrocarbon resins, and dicyclopentadiene-based resins. These tackifying resins, if added, can be hydrogenated to lower their color contribution to the particular pressure-sensitive adhesive composition. Combinations of various tackifiers can be used if desired.

Tackifiers that are rosin esters are the reaction products of various rosin acids and alcohols. These include, but are not limited to, methyl esters of rosin acids, triethylene glycol esters of rosin acids, glycerol esters of rosin acids, and pentaertythritol esters of rosin acids. These rosin esters can be hydrogenated partially or fully to improve stability and reduce their color contribution to the pressure-sensitive adhesive composition. The rosin resin tackifiers are commercially available, for example, from Eastman Chemical Company under the trade designations PERMALYN, STAYBELITE, and FORAL as well as from Newport Industries under the trade designations NUROZ and NUTAC. A fully hydrogenated rosin resin is commercially available, for example, from Eastman Chemical Company under the trade designation FORAL AX-E. A partially hydrogenated rosin resin is commercially available, for example, from Eastman Chemical Company under the trade designation STAYBELITE-E.

Tackifiers that are hydrocarbon resins can be prepared from various petroleum-based feed stocks. These feed stocks can be aliphatic hydrocarbons (mainly C5 monomers with some other monomers present such as a mixture of trans-1,3-pentadiene, cis-1,3-pentadiene, 2-methyl-2-butene, dicyclopentadiene, cyclopentadiene, and cyclopentene), aromatic hydrocarbons (mainly C9 monomers with some other monomers present such as a mixture of vinyl toluenes, dicyclopentadiene, indene, methylstyrene, styrene, and methylindenes), or mixtures thereof. Tackifiers derived from C5 monomers are referred to as C5-based hydrocarbon resins while those derived from C9 monomers are referred to as C9-based hydrocarbon resins. Some tackifiers are derived from a mixture of C5 and C9 monomers or are a blend of C5-based hydrocarbon tackifiers and C9-based hydrocarbon tackifiers. These tackifiers can be referred to as C5/C9-based hydrocarbon tackifiers. Any of these resins can be partially or fully hydrogenated to improve their color, their thermal stability or their process compatibility.

The C5-based hydrocarbon resins are commercially available from Eastman Chemical Company under the trade designations PICCOTAC and EASTOTAC, from Cray Valley under the trade designation WINGTACK, from Neville Chemical Company under the trade designation NEVTAC LX, and from Kolon Industries, Inc. under the trade designation HIKOREZ. The C5-based hydrocarbon resins are commercially available from Eastman Chemical with various degrees of hydrogenation under the trade designation EASTOTACK.

The C9-based hydrocarbon resins are commercially available from Eastman Chemical Company under the trade designation PICCO, KRISTLEX, PLASTOLYN, and PICCOTAC, and ENDEX, from Cray Valley under the trade designations NORSOLENE, from Ruetgers N.V. under the trade designation NOVAREZ, and from Kolon Industries, Inc. under the trade designation HIKOTAC. These resins can be partially or fully hydrogenated. Prior to hydrogenation, the C9-based hydrocarbon resins are often about 40 percent aromatic as measured by proton Nuclear Magnetic Resonance. Hydrogenated C9-based hydrocarbon resins are commercially available, for example, from Eastman Chemical under the trade designations REGALITE and REGALREZ that are 50 to 100 percent (e.g., 50 percent, 70 percent, 90 percent, and 100 percent) hydrogenated. The partially hydrogenated resins typically have some aromatic rings.

Various C5/C9-based hydrocarbon tackifiers are commercially available from Arakawa under the trade designation ARKON, from Zeon under the trade designation QUINTONE, from Exxon Mobile Chemical under the trade designation ESCOREZ, and from Newport Industries under the trade designations NURES and H-REZ (Newport Industries).

Any of the tackifiers may be used in amounts of up to 100 parts relative to 100 parts of the polymerizable material. It is however preferred to use lower amounts of tackifiers. For example, the tackifiers can be used in amounts up to 50 parts, up to 45 parts, up to 40 parts, up to 35 parts, or up to 30 parts. The amount of tackifier can be for example, in the range of 3 to 50 parts, in the range of 3.5 to 45 parts, in the range of 4 to 40 parts, in the range of 4.5 to 35 parts, or in the range of 5 to 30 parts based on 100 parts of the polymerizable material. In some other aspects, the tackifier may be used in an amount from 3 to 100 parts, or from 3 to 80 parts based on 100 parts of the polymerizable material.

In an advantageous aspect of the pressure sensitive adhesive assembly of the present disclosure, the tackifying resin is selected from the group consisting of C5-based hydrocarbon resins, C9-based hydrocarbon resins, C5/C9-based hydrocarbon resins, and any combinations or mixtures thereof. In another advantageous aspect, the tackifying resin is selected from the group consisting of hydrogenated terpene resins, hydrogenated rosin resins, hydrogenated C5-based hydrocarbon resins, hydrogenated C9-based hydrocarbon resins, hydrogenated C5/C9-based hydrocarbon resins, and any combinations or mixtures thereof.

Some pressure-sensitive adhesive compositions useful for the pressure sensitive adhesive assembly according to this disclosure may include one or more plasticizers. The plasticizer is typically selected to be compatible with (i.e., miscible with) the other components in the composition such as the polymerizable material and any optional tackifier. Suitable plasticizers include, but are not limited to, various polyalkylene oxides (e.g., polyethylene oxides or propylene oxides), adipic acid esters, formic acid esters, phosphoric acid esters, benzoic acid esters, phthalic acid esters, and sulfonamides, or naphthenic oils.

According to one particular aspect of the pressure sensitive adhesive assembly according to the present disclosure, the polymerizable material may further comprise a crosslinker (also referred to as crosslinking agent), preferably in an amount of up to 5 weight percent, based on the total weight of polymerizable material.

A crosslinker can also be used, in the context of the present disclosure, as a second monomer having an ethylenically unsaturated group. The crosslinker often increases the cohesive strength and the tensile strength of the polymerizable material. The crosslinker can have at least two functional groups which are capable of polymerizing with the first monomer or another monomer. That is, the crosslinker can have at least two ethylenically unsaturated groups. Suitable crosslinkers often have multiple (meth)acryloyl groups. Alternatively, the crosslinker can have at least two groups that are capable of reacting with various functional groups (i.e., functional groups that are not ethylenically unsaturated groups) on another monomer. For example, the crosslinker can have multiple groups that can react with functional groups such as acidic groups on other monomers.

Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In many aspects, the crosslinkers contain at least two (meth)acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, Ga. and under the trade designation SR-351 from Sartomer, Exton, Pa.), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth)acryloyl groups includes, but is not limited to, dipentaerythritol pentaacrylate (e.g., commercially available under the trade designation SR-399 from Sartomer).

In some aspects, the crosslinkers are polymeric material that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

Other types of crosslinkers can be used rather than those having at least two (meth)acryloyl groups. The crosslinker can have multiple groups that react with functional groups such as acidic groups on other second monomers. For example, monomers with multiple aziridinyl groups can be used that are reactive with carboxyl groups. For example, the crosslinkers can be a bis-amide crosslinker as described in U.S. Pat. No. 6,777,079 (Zhou et al.).

In other methods of crosslinking, photocrosslinkers (e.g., UV photocrosslinkers) are added. These photocrosslinkers can be copolymerizable with the various monomers used to form the elastomeric material (e.g., copolymerizable benzophenones) or can be added after polymerization.

Suitable photocrosslinkers added after polymerization include, for example, multifunctional benzophenones, triazines (such as XL-330, which is 2,4,-bis(trichloromethyl)-6-(4-methoxyphenyl)-triazine from 3M Company, Saint Paul, Minn.), acetophenones, and the like.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A, EP 2 414 143 A, EP 2 192 148 A, EP 2 186 869, EP 0 752 435 A, EP 1 802 722 A, EP 1 791 921 A, EP 1 791 922 A, EP 1 978 069 A, and DE 10 2008 059 050 A, the relevant contents of which are herewith incorporated by reference. Suitable accelerant and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under trade name UVACURE 1500.

If present, a crosslinker can be used in any suitable amount. In many aspects, the crosslinker is present in an amount of up 5 parts by weight based on a total weight of polymerizable material. In some aspects, the crosslinker is present in an amount up to 4 weight percent, up to 3 weight percent, up to 2 weight percent, or up to 1 weight percent. The crosslinker can be present, for example, in amounts greater than 0.01 weight percent, greater than 0.03 weight percent, greater than 0.05 weight percent, greater than 0.07 weight percent, or greater than 1 weight percent. In some aspects, the crosslinker is present in an amount in a range of 0 to 5 weight percent, 0.01 to 5 weight percent, 0.05 to 5 weight percent, 0 to 3 weight percent, 0.01 to 3 weight percent, 0.05 to 3 weight percent, 0 to 1 weight percent, 0.01 to 1 weight percent, or 0.05 to 1 weight percent. As another example, any of the polymerizable materials can include up to 5 weight percent crosslinker such as 0.01 to 5 weight percent, 0.05 to 5 weight percent, 0.07 to 5 weight percent, or 1 to 5 weight percent.

Aside from thermal, moisture or photosensitive crosslinking agents, crosslinking may also be achieved using high energy electromagnetic radiation such as gamma or e-beam radiation.

An initiator for free radical polymerization is typically added to the various monomers used to form the polymerizable material. The polymerization initiator can be a thermal initiator, a photoinitiator, or both. Any suitable thermal initiator or photoinitiator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of polymerizable material.

In some executions, a thermal initiator is used. Thermal initiators can be water-soluble or water-insoluble (i.e., oil-soluble) depending on the particular polymerization method used. Suitable water-soluble initiators include, but are not limited to, persulfates such as potassium persulfate, ammonium persulfate, sodium persulfate, and mixtures thereof; an oxidation-reduction initiator such as the reaction product of a persulfate and a reducing agent such as a metabisulfite (e.g., sodium metabisulfite) or a bisulfate (e.g., sodium bisulfate); or 4,4'-azobis(4-cyanopentanoic acid) and its soluble salts (e.g., sodium, potassium). Suitable oil-soluble initiators include, but are not limited to, various azo compounds such as those commercially available under the trade designation VAZO from E. I. DuPont de Nemours Co. including VAZO 67, which is 2,2'-azobis(2-methylbutane nitrile), VAZO 64, which is 2,2'-azobis(isobutyronitrile), and VAZO 52, which is (2,2'-azobis(2,4-dimethylpentanenitrile); and various peroxides such as benzoyl peroxide, cyclohexane peroxide, lauroyl peroxide, and mixtures thereof.

In many executions, a photoinitiator is used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J.) or under the trade designation ESACURE KB-1 from Sartomer (Exton, Pa.)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxy cyclohexyl phenyl ketone (IRGACURE 184), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), and 2-hydroxy-2-methyl-1-phenyl propan-1-one (DAROCUR 1173).

The particular polymerizable material used to produce the first pressure sensitive adhesive layer and/or the second pressure sensitive adhesive layer and/or the third pressure sensitive adhesive layer may optionally further contain chain transfer agents to control the molecular weight of the resultant elastomeric material. Examples of useful chain transfer agents include, but are not limited to, carbon tetrabromide, alcohols, mercaptans such as isooctylthioglycolate, and mixtures thereof. If used, the polymerizable mixture may include up to 0.5 weight of a chain transfer agent based on a total weight of polymerizable material. For example, the polymerizable mixture can contain 0.01 to 0.5 weight percent, 0.05 to 0.5 weight percent, or 0.05 to 0.2 weight percent chain transfer agent.

According to one particular aspect of the pressure sensitive adhesive assembly according to the present disclosure, the particular polymerizable material used to produce the first pressure sensitive adhesive layer and/or the second pressure sensitive adhesive layer and/or the third pressure sensitive adhesive layer may further include one or more other vinyl monomers such as vinyl esters (e.g., vinyl acetate and vinyl propionate); styrene or derivatives thereof such as alkyl substituted styrene (e.g., α-methyl styrene); vinyl halide; or mixtures thereof. These monomers can be polar or non-polar. If present, these other vinyl monomer can be present in any suitable amount. In some aspects, the vinyl monomers are present in an amount of up 5 parts by weight, based on a total weight of polymerizable material. For example, the vinyl monomer can be used in amounts up to 4 weight percent, up to 3 weight percent, or up to 2 weight percent. In some particular aspects, the vinyl monomer is present in an amount in a range of 0 to 5 weight percent, 0.5 to 5 weight percent, 1 to 5 weight percent, 0 to 3 weight percent, or 1 to 3 weight percent.

The polymerizable material used to form the pressure sensitive adhesive layer(s) of the PSA assembly may include an organic solvent or may be free or essentially free of an organic solvent. As used herein, the term "essentially free" in reference to an organic solvent means that the means that the organic solvent is present in an amount less than 5 weight percent, less than 4 weight percent, less than 3 weight percent, less than 2 weight percent, or less than 1 weight percent based on the weight of the polymerizable material. If an organic solvent is included in the polymerizable material, the amount is often selected to provide the desired viscosity. Examples of suitable organic solvents include, but are not limited to, methanol, tetrahydrofuran, ethanol, isopropanol, heptane, acetone, methyl ethyl ketone, methyl acetate, ethyl acetate, toluene, xylene, ethylene glycol alkyl ether, and any combinations or mixtures thereof.

The particular pressure-sensitive adhesive compositions may be prepared by a variety of conventional free radical polymerization methods, including solution, bulk (i.e., with little or no solvent), dispersion, emulsion, and suspension processes. The particular method used may be influenced by the use of the final pressure sensitive adhesive composition. The reaction product of the polymerizable materials can be random or block copolymers.

In some methods of preparing the pressure sensitive adhesive composition(s) for the pressure sensitive adhesive layer(s) of the PSA assembly according to the disclosure, the polymerizable material containing the monomers is partially polymerized so as to increase its viscosity to that corresponding to a syrup-like material. Generally, the main monomers and other optional monomers are mixed with a portion of the free radical polymerization initiator. Depending on the type of initiator added, the mixture is typically exposed to actinic radiation or heat to partially polymerize the monovalent monomers (i.e., monomers with a single ethylenically unsaturated group). Then, the crosslinker and any remaining portion of the initiator may be added to the syrup-like, partially polymerized material. Optional tackifiers and plasticizers may also be combined with the partially polymerized material. The resulting mixture can be more readily applied as a coating composition onto a support (e.g., release liner) or another layer (e.g., polymeric foam layer). The coating layer can then be exposed to actinic radiation if a photoinitiator is present or to heat if a thermal initiator is present. Exposure to actinic radiation or heat typically results in the further reaction of polymerizable material within the coating composition.

To be useful as a pressure sensitive adhesive, the pressure sensitive adhesive material typically has a storage modulus less than 300,000 Pascals at 25° C. The storage modulus of the pressure-sensitive adhesive material usually is no greater than 200,000 Pascals, no greater than 100,000 Pascals, no greater than 50,000 Pascals, or no greater than 25,000 Pascal at 25° C. For example, the storage modulus can be no greater than 10,000 Pascals, no greater than 9,000 Pascals, no greater than 8,000 Pascals, or no greater than 7,500 Pascals at 25° C. A lower storage modulus is often desirable for high performance pressure-sensitive adhesives.

In a particular aspect of the pressure-sensitive adhesive assembly according to the present disclosure, the first pressure sensitive adhesive layer and/or the second pressure sensitive adhesive layer and/or the third pressure sensitive adhesive layer comprise a (further) filler material.

Any filler material commonly known to those skilled in the art may be used in the context of the present disclosure. Typical examples of filler material that can be used herein include, but are not limited to, those selected from the group consisting of expanded perlite, microspheres, expandable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a particular aspect of the pressure sensitive adhesive assembly according to the disclosure, the second pressure sensitive adhesive layer and/or the third pressure sensitive adhesive layer may further comprise a hollow non-porous particulate filler material, wherein the surface of the hollow non-porous particulate filler material is preferably provided with an hydrophobic surface modification. Such fillers may be advantageously used to e.g. increase the mechanical stability of the pressure sensitive adhesive assembly and may also increase its shear and peel force resistance.

From the filler particles set out above, fumed silica particles may be advantageously used in combination with the hollow non-porous particulate filler material as described above.

As will be apparent to those skilled in the art in the light of the present disclosure, other additives may optionally be included in any layer of the pressure sensitive adhesive assembly to achieve any desired properties. Such additives, include pigments, tackifiers, toughening agents, reinforcing agents, fire retardants, antioxidants, and various stabilizers. The additives are added in amounts sufficient to obtain the desired end properties.

According to a typical execution, the pressure sensitive adhesive assembly according to the present disclosure is further provided on at least one of its major surfaces with a release liner. As release liner, any suitable material known to the skilled person can be used, such as e.g. a siliconized paper or siliconized polymeric film material, in particular a siliconized PET-film or a siliconized PE or PE/PP blend film material.

The thickness of the various pressure sensitive adhesive layer(s) and other optional layer(s) comprised in the pressure sensitive adhesive assembly may vary in wide ranges depending on the desired execution and associated properties. By way of example, the thickness can be independently chosen for each layer between 25 µm and 6000 µm, between 40 µm and 3000 µm, between 50 µm and 3000 µm, between 75 µm and 2000 µm, or even between 75 µm and 1500 µm.

According to the particular execution, wherein the multilayer pressure sensitive adhesive assembly takes the form of skin/core type multilayer pressure sensitive adhesive assembly, wherein the first pressure sensitive adhesive layer is the core layer of the multilayer pressure sensitive adhesive assembly and the second pressure sensitive adhesive layer is the skin layer of the multilayer pressure sensitive adhesive assembly, it is preferred that the second pressure sensitive adhesive layer has a lower thickness compared to the first pressure sensitive adhesive layer. This is particularly advantageous in executions where the first pressure sensitive adhesive layer is a polymeric foam layer, thereby forming a polymeric foam pressure sensitive adhesive tape. As a way of example, the thickness of the second pressure sensitive adhesive layer may typically be in the range from 20 μm to 250 μm, or even from 40 μm to 200 μm, whereas the thickness of the polymeric foam layer may typically be in the range from 100 μm to 6000 μm, from 400 μm to 3000 μm, or even from 800 μm to 2000 μm. Such multilayer pressure sensitive adhesive assemblies typically exhibit high peel adhesion. Without wishing to be bound by theory, it is believed such high peel adhesion is caused by a stabilizing effect of the relatively thick polymeric foam layer compared to the first PSA layer.

The present disclosure is further directed to a method of manufacturing a pressure sensitive adhesive assembly comprising at least a first pressure sensitive adhesive layer, the process comprising the steps of:

a) providing a precursor composition of at least a first pressure sensitive adhesive layer; and b) incorporating a hollow non-porous particulate filler material into the precursor composition of at least a first pressure sensitive adhesive layer, wherein the surface of the hollow non-porous particulate filler material is provided with a hydrophobic surface modification.

According to a particular aspect of this method of manufacturing a pressure sensitive adhesive assembly, a liquid precursor of the first pressure sensitive adhesive layer is deposited on a substrate and then cured, preferably with actinic radiation, e-beam radiation or by thermal curing.

According to an exemplary aspect of this method, the first pressure sensitive adhesive layer and a second pressure sensitive adhesive layer and/or a third pressure sensitive adhesive layer are prepared separately and subsequently laminated to each other.

According to an alternative exemplary aspect of this method, a liquid precursor of a second pressure sensitive adhesive layer and/or a third pressure sensitive adhesive layer is superimposed on the liquid precursor of the first pressure sensitive adhesive layer before curing, in particular with actinic radiation such as UV, γ (gamma) or e-beam radiation or by thermal curing. This method is described in full details in WO 2011094385(A1), the content of which is herewith incorporated by reference.

However, the production of the pressure sensitive adhesive assembly is not limited to the before mentioned methods. For instance, the pressure sensitive adhesive assembly may be produced by co-extrusion, solvent-based methods or also combinations thereof.

According to the particular aspect wherein the surface of the hollow non-porous particulate filler material is rendered hydrophobic by chemically reacting the hollow non-porous particulate filler material with a silane, preferably an organosilane, more preferably a silane containing at least one hydrolysable functional group and at least one non-hydrolysable functional group, the hollow non-porous particulate filler material, in particular the hollow glass microspheres, may be advantageously pre-treated with hydrogen peroxide.

Accordingly, in another aspect of the present disclosure, it is provided a process for the preparation of hollow non-porous particulate filler material functionalized with an organosilane compound comprising the steps of:

a) pre-treating the hollow non-porous particulate filler material, in particular the hollow glass microspheres, with hydrogen peroxide;

b) hydrolyzing the organosilane compound;

c) functionalizing the hollow non-porous particulate filler material with the hydrolyzed organosilane compound;

d) vacuum filtering the functionalized hollow non-porous particulate filler material; and e) curing the functionalized hollow non-porous particulate filler material at a temperature preferably comprised between 120 and 150° C.

The hollow non-porous particulate filler material, in particular the hollow glass microspheres, may be advantageously treated with $H_2O_2$ (hydrogen peroxide) prior to functionalization. Without wishing to be bound by theory, it is believed that the pre-treatment with hydrogen peroxide forms functional groups which are mostly non-phenolic OH groups on the hollow non-porous particulate filler material which are thermally stable. The introduction of these functional groups is believed to increase the concentration of carboxylic functionalities, which decompose at higher temperatures.

In a particular aspect, the hollow non-porous particulate filler material is treated with an aqueous solution of $H_2O_2$ (30% concentration), boiling for 4 h, and then washed with water until neutral pH is obtained. This process is suitably carried out at temperatures between 70 and 120° C., or between 90 and 110° C.

Before being used in the composition of the present disclosure, the functional organosilane compounds are preferably subjected to a partial or total hydrolysis treatment. Without wishing to be bound by theory , it is believed that during the hydrolysis treatment, the OR groups of the organosilane compound are partly or completely converted into OH groups which are chemically active and capable of chemically bonding with other functional groups. Hydrolysis treatment of the functional organic silanes may be for example performed by merely mixing the organosilane compound with water in the presence of an acid and possibly in the presence of a solvent, such as e.g. an alcohol such as isopropyl alcohol, in order to improve its solubility.

Functionalization of the hollow non-porous particulate filler material with the hydrolyzed organosilane compound may be carried out by processes well known in the art. Suitably, the process is carried out in a launderometer at a temperature of from 40 to 100° C., or from 40 to 65° C. for about 20 to 30 hours or this reaction can be performed in a regular reactor with a condenser assembly. The functionalized hollow non-porous particulate filler material may then be vacuum filtered after e.g. continuous mixing in launderometer for a suitable duration and cured at a temperature typically comprised between 120 and 150° C.

The pressure sensitive adhesive assembly of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl(meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The pressure sensitive adhesive assemblies of the present disclosure may be used in any article conventionally known to use such assemblies such as labels, tapes, signs, covers, marking indices, display components, touch panels, and the like. Flexible backing materials having microreplicated surfaces are also contemplated.

The pressure sensitive adhesive assembly may be coated/applied on a substrate using any conventional coating techniques modified as appropriate to the particular substrate. For example, pressure sensitive adhesive assemblies may be applied/coated to a variety of solid substrates by methods such as roller coating, flow coating, dip coating, spin coating, spray coating knife coating, and die coating. These various methods of coating allow the pressure sensitive adhesive assemblies to be placed on the substrate at variable thicknesses thus allowing a wider range of use of the assemblies.

The pressure sensitive adhesive assembly according to the present disclosure may be particularly useful for forming strong adhesive bonds to low surface energy (LSE) substrates. Included among such materials are polypropylene, polyethylene (e.g., high density polyethylene or HDPE), blends of polypropylene (e.g. PP/EPDM, TPO). Other substrates may also have properties of low surface energy due to a residue, such as an oil residue or a film, such as paint, being on the surface of the substrate.

However, even though the pressure sensitive adhesive assemblies bond well to low surface energy surfaces, the use of these adhesives is not limited to low surface energy substrates. The pressure sensitive adhesives assemblies surprisingly bond well to medium surface energy (MSE) substrates such as, for example, polyamide 6 (PA6), acrylonitrile butadiene styrene (ABS), PC/ABS blends, PC, PVC, PA, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

Surprisingly still, the pressure sensitive adhesive assemblies according to the present disclosure also provide strong adhesive bond to higher surface energy (HSE) substrates such as, for example, ceramics, glasses, and metals.

Accordingly, the present disclosure is further directed to the use of a pressure sensitive adhesive assembly as above described for the bonding to a low surface energy substrate, a medium surface energy substrate and/or a high surface energy substrate.

The substrate to which the pressure sensitive adhesive assembly may be applied is selected depending on the particular application. For example, the pressure sensitive adhesive assembly, in particular via its second and/or third pressure sensitive adhesive layer may be applied to sheeting products (e.g., decorative graphics and reflective products), label stock, and tape backings. Additionally, the pressure sensitive adhesive assembly may be applied directly onto other substrates such as a metal panel (e.g., automotive panel) or a glass window so that yet another substrate or object can be attached to the panel or window. Accordingly, the pressure sensitive adhesive assembly of the present disclosure may find a particular use in the automotive manufacturing industry (e.g. for attachment of exterior trim parts or for weatherstrips), in the construction industry or in the solar panel construction industry.

Accordingly, the present disclosure is further directed to the use of a pressure sensitive adhesive assembly as above described for industrial applications, in particular for construction applications and automotive applications.

The pressure sensitive adhesive assembly may also be provided in the form of a pressure-sensitive adhesive transfer tape in which at least one layer of the pressure sensitive adhesive assembly is disposed on a release liner for application to a permanent substrate at a later time. The pressure sensitive adhesive assembly may also be provided as a single coated or double coated tape in which the pressure sensitive adhesive assembly is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Polymeric foams are commercially available from various suppliers such as 3M Co., Voltek, Sekisui, and others. The polymeric foam layer may be formed as a coextruded sheet with the pressure sensitive adhesive assembly on one or both sides of the polymeric foam layer, or the pressure sensitive adhesive assembly may be laminated to it. When the pressure sensitive adhesive assembly is laminated to the substrate, it may be desirable to treat the surface of the substrate to improve the adhesion. Such treatments are typically selected based on the nature of the materials in the pressure sensitive adhesive assembly and of the substrate and include primers and surface modifications (e.g., corona treatment and surface abrasion).

For a single-sided tape, the pressure sensitive adhesive assembly is applied to one surface of the backing material and a suitable release material is applied to the opposite surface of the backing material. Release materials are known and include materials such as, for example, silicones, polyolefins, polycarbamates, polyacrylics, and the like. For double coated tapes, the pressure sensitive adhesive assembly is applied to one surface of the backing material and a pressure sensitive adhesive assembly is disposed on the opposite surface of the backing material. Double coated tapes are often carried on a release liner.

Item 1 is a pressure sensitive adhesive assembly comprising at least a first pressure sensitive adhesive layer comprising a hollow non-porous particulate filler material, wherein the surface of the hollow non-porous particulate filler material is provided with a hydrophobic surface modification.

Item 2 is the pressure sensitive adhesive assembly of item 1, wherein the hollow non-porous particulate filler material comprises (or consists of) inorganic material.

Item 3 is a pressure sensitive adhesive assembly according to item 1 or 2, wherein the hollow non-porous particulate filler material consists of hollow glass microspheres.

Item 4 is a pressure sensitive adhesive assembly according to any of the preceding items, wherein the hydrophobic surface modification of the hollow non-porous particulate filler material is performed with non-polar groups, preferably alkyl groups through covalent bonds, more preferably through covalent siloxane bonds, between the non-polar groups (preferably, alkyl groups) and the surface of the hollow non-porous particulate filler material.

Item 5 is a pressure sensitive adhesive assembly according to any of the preceding items, wherein the surface of the hollow non-porous particulate filler material is rendered hydrophobic by chemically reacting the hollow non-porous particulate filler material with a silane, preferably a silane containing at least one hydrolysable functional group and at least one non-hydrolysable functional group.

Item 6 is a pressure sensitive adhesive assembly according to any of item 4 or 5, wherein the surface of the hollow non-porous particulate filler material is rendered hydrophobic by chemically reacting said non-porous particulate filler material with an alkyl silane or an alkoxy silane, more preferably an alkoxy silane containing at least one hydrolysable functional group and at least one non-hydrolysable functional group.

Item 7 is a pressure sensitive adhesive assembly according to item 6, wherein the alkoxy silane has the following formula:

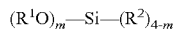

wherein:
- $R^1$ is independently an alkyl group, preferably comprising 1 to 6, more preferably 1 to 4 carbon atoms, even more preferably $R^1$ is independently selected from the group consisting of methyl, ethyl, propyl and butyl, more preferably from the group consisting of methyl and ethyl;
- m=1 to 3, preferably m=2 or 3; more preferably m=3;
- $R^2$ is independently an hydrophobic (non-hydrolyzable) moiety, preferably selected from the group consisting of saturated, unsaturated, substituted or un-substituted alkyls, ethers, thioethers, esters, amides, amines, carbamates, urethanes, polyolefins, and any combinations thereof, preferably comprising from 1 to 100, more preferably from 1 to 50, even more preferably from 1 to 30 carbon atoms, still more preferably from 1 to 25 carbon atoms; yet more preferably $R^2$ is independently selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and fluorinated derivatives thereof, tridecafluoro-1,2,2,2-tetrahydrooctyl; yet more preferably $R^2$ is independently selected from the group consisting of methyl, n-octyl, hexadecyl and tridecafluoro-1,2,2,2-tetrahydrooctyl.

Item 8 is a pressure sensitive adhesive assembly according to any of items 5 to 7, wherein the surface of the hollow non-porous particulate filler material is pre-treated with hydrogen peroxide prior to being provided with a hydrophobic surface modification.

Item 9 is a pressure sensitive adhesive assembly according to any of the preceding items, wherein the hydrophobic surface modification of the hollow non-porous particulate filler material is performed by applying an hydrophobic coating.

Item 10 is a pressure sensitive adhesive assembly according to item 8, wherein the hydrophobic coating is applied by contacting the hollow non-porous particulate filler material with a liquid medium selected from the group of emulsions, suspensions or solutions, and comprising a component preferably selected from the group consisting of alkoxy silanes, hydrocarbon waxes, polyethylene waxes, fluorinated hydrocarbon waxes, silicone, and any combinations or mixtures thereof.

Item 11 is a pressure sensitive adhesive assembly according to any of the preceding items, wherein the hollow non-porous particulate filler material content ranges from 1 to 30 wt. %, preferably from 2 to 20 wt. %, more preferably from 2 to 15 wt. % of the first pressure sensitive adhesive layer.

Item 12 is a pressure sensitive adhesive assembly according to any of the preceding items, wherein the average particle size of the hollow non-porous particulate filler material is comprised between 1 and 500 µm, between 10 and 300 µm, between 10 and 200 µm, between 30 and 150 µm, or even between 50 and 100 µm.

Item 13 is a pressure sensitive adhesive assembly according to any of the preceding items, wherein the first pressure sensitive adhesive layer takes the form of a polymeric foam layer.

Item 14 is a pressure sensitive adhesive assembly according to any of the preceding items, which is in the form of a multilayer pressure sensitive adhesive assembly further comprising a second pressure sensitive adhesive layer adjacent to the first pressure sensitive adhesive layer.

Item 15 is a pressure sensitive adhesive assembly according to item 14, which is in the form of a skin/core multilayer pressure sensitive adhesive assembly, wherein the first pressure sensitive adhesive layer is the core layer of the multilayer pressure sensitive adhesive assembly and the second pressure sensitive adhesive layer is the skin layer of the multilayer pressure sensitive adhesive assembly.

Item 16 is a pressure sensitive adhesive assembly according to any of item 14 or 15, which is in the form of a multilayer pressure sensitive adhesive assembly further comprising a third pressure sensitive adhesive layer which is preferably adjacent to the first pressure sensitive adhesive layer in the side of the first pressure sensitive adhesive layer which is opposed to the side of the first pressure sensitive adhesive layer adjacent to the second pressure sensitive adhesive layer.

Item 17 is a pressure sensitive adhesive assembly according to item 16, which is in the form of a skin/core/skin multilayer pressure sensitive adhesive assembly, wherein the first pressure sensitive adhesive layer is the core layer of the multilayer pressure sensitive adhesive assembly, the second pressure sensitive adhesive layer is the first skin layer of the multilayer pressure sensitive adhesive assembly and the third pressure sensitive adhesive layer is the second skin layer of the multilayer pressure sensitive adhesive assembly.

Item 18 is a pressure sensitive adhesive assembly according to any of the preceding items, wherein the first pressure sensitive adhesive layer and/or the second pressure sensitive adhesive layer and/or the third pressure sensitive adhesive layer comprises a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

Item 19 is a pressure sensitive adhesive assembly according to item 18, wherein the first pressure sensitive adhesive layer and/or the second pressure sensitive adhesive layer and/or the third pressure sensitive adhesive layer comprises a polymer base material selected from the group consisting of polyacrylates whose main monomer component preferably comprises a linear or branched alkyl (meth)acrylate ester, preferably a non-polar linear or branched alkyl (meth)acrylate ester having a linear or branched alkyl group comprising preferably from 1 to 32, from 1 to 20, or even from 1 to 15 carbon atoms.

Item 20 is a pressure sensitive adhesive assembly according to item 18 or 19, wherein the first pressure sensitive adhesive layer and/or the second pressure sensitive adhesive layer and/or the third pressure sensitive adhesive layer comprises a polymer base material selected from the group consisting of polyacrylates whose main monomer component comprises a linear or branched alkyl (meth)acrylate ester selected from the group consisting of methyl (meth)acrylate, ethyl (meth)acrylate, n-propyl (meth)acrylate, isopropyl (meth)acrylate, n-butyl acrylate, isobutyl acrylate, tert-butyl (meth)acrylate, n-pentyl (meth)acrylate, iso-pentyl (meth)acrylate, n-hexyl (meth)acrylate, iso-hexyl (meth)

acrylate, cyclohexyl (meth)acrylate, phenyl (meth)acrylate, octyl (meth)acrylate, iso-octyl (meth)acrylate, 2-octyl(meth) acrylate, 2-ethylhexyl (meth)acrylate, decyl (meth)acrylate, lauryl (meth)acrylate, 2-propylheptyl (meth)acrylate, stearyl (meth)acrylate, isobornyl acrylate, benzyl (meth)acrylate, octadecyl acrylate, nonyl acrylate, dodecyl acrylate, isophoryl (meth)acrylate, and any combinations or mixtures thereof.

Item 21 is a pressure sensitive adhesive assembly according to item 20, wherein the linear or branched alkyl (meth) acrylate ester is selected from the group consisting of iso-octyl (meth)acrylate, 2-ethylhexyl (meth)acrylate, 2-propylheptyl (meth)acrylate, 2-octyl (meth)acrylate, butyl acrylate, and any combinations or mixtures thereof; more preferably from the group consisting of iso-octyl acrylate, 2-ethylhexyl acrylate, 2-octyl acrylate, and 2-propylheptyl acrylate.

Item 22 is a pressure sensitive adhesive assembly according to any of items 18 to 21, wherein the polymer base material further comprises a polar comonomer, preferably a polar acrylate, more preferably selected from the group consisting of acrylic acid, methacrylic acid, itaconic acid, hydroxyalkyl acrylates, acrylamides and substituted acrylamides, acrylamines and substituted acrylamines and any combinations or mixtures thereof.

Item 23 is a pressure sensitive adhesive assembly according to any of items 16 to 22, wherein the second pressure sensitive adhesive layer and/or the third pressure sensitive adhesive layer further comprise a hollow non-porous particulate filler material, wherein the surface of the hollow non-porous particulate filler material is provided with an hydrophobic surface modification.

Item 24 is a pressure sensitive adhesive assembly according to any of items 16 to 23, wherein the first pressure sensitive adhesive layer and/or the second pressure sensitive adhesive layer and/or the third pressure sensitive adhesive layer comprise a further filler material which is preferably selected from the group consisting of filler particles, in particular expanded perlite, microspheres, expandable microspheres, expanded microspheres, ceramic spheres, zeolites, clay fillers, glass beads, hollow inorganic beads, silica type fillers, hydrophobic silica type fillers, hydrophilic silica type fillers, fibers, in particular glass fibers, carbon fibers, graphite fibers, silica fibers, ceramic fibers, grids, meshes, non-wovens, electrically and/or thermally conducting particles, nanoparticles, in particular silica nanoparticles, and any combinations thereof.

Item 25 is a method of manufacturing a pressure sensitive adhesive assembly comprising at least a first pressure sensitive adhesive layer, the process comprising the steps of:
  a) providing a precursor composition of at least a first pressure sensitive adhesive layer; and
  b) incorporating a hollow non-porous particulate filler material into the precursor composition of at least a first pressure sensitive adhesive layer, wherein the surface of the hollow non-porous particulate filler material is provided with a hydrophobic surface modification.

Item 26 is the method of manufacturing a pressure sensitive adhesive assembly of item 25, whereby a (liquid) precursor of the first pressure sensitive adhesive layer is deposited on a substrate and then cured, preferably with actinic radiation, e-beam radiation or by thermal curing.

Item 27 is a method according to item 26, whereby a (liquid) precursor of a second pressure sensitive adhesive layer and/or a third pressure sensitive adhesive layer is superimposed on the (liquid) precursor of the first pressure sensitive adhesive layer before curing.

Item 28 is a method according to any of items 25 to 27, whereby the pressure sensitive adhesive assembly is produced as a single or multilayer pressure sensitive adhesive assembly by (co-)extrusion, solvent-based methods or combinations thereof.

Item 29 is a method according to any of item 25 or 26, whereby the first pressure sensitive adhesive layer and a second pressure sensitive adhesive layer and/or a third pressure sensitive adhesive layer are prepared separately and subsequently laminated to each other.

Item 30 is a process for the preparation of hollow non-porous particulate filler material functionalized with an organosilane compound comprising the steps of:
  a) pre-treating the hollow non-porous particulate filler material, in particular the hollow glass microspheres, with hydrogen peroxide;
  b) hydrolyzing the organosilane compound;
  c) functionalizing the hollow non-porous particulate filler material with the hydrolyzed organosilane compound;
  d) vacuum filtering the functionalized hollow non-porous particulate filler material; and
  e) curing the functionalized hollow non-porous particulate filler material at a temperature preferably comprised between 120 and 150° C.

Item 31 is the use of a pressure sensitive adhesive assembly according to any of items 1 to 24 for the bonding to a low surface energy substrate, a medium surface energy substrate and/or a high surface energy substrate.

Item 32 is the use of a pressure sensitive adhesive according to any of items 1 to 24 for industrial applications, in particular for construction applications and automotive applications.

EXAMPLES

The disclosure is further illustrated by the following examples. These examples are merely for illustrative purposes only and are not meant to be limiting on the scope of the appended claims.

A) Examples 1 to 21

Test Methods Applied:
90° -Peel-Test at 300 mm/min (according to Test Method, Finat No. 2):

Pressure sensitive adhesive assembly strips according to the present disclosure and having a width of 10 mm and a length>175 mm are cut out in the machine direction from the sample material. For test sample preparation, the liner is first removed from the one adhesive side and placed on an aluminum strip having the following dimension 22×1.6 cm. Then, the adhesive coated side of each PSA assembly strip is placed, after the liner is removed, with its adhesive side down on a clean test panel using light finger pressure. Next, the test samples are rolled twice in each direction with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell 72 hours at ambient room temperature (23° C. +/−2° C., 50% relative humidity +/−5%) prior to testing.

For peel testing, the test samples are in a first step clamped in the lower movable jaw of a Zwick tensile tester (Model Z020 commercially available from Zwick/Roell GmbH, Ulm, Germany). The multilayer pressure sensitive adhesive film strips are folded back at an angle of 90° and their free ends grasped in the upper jaw of the tensile tester in a configuration commonly utilized for 90° peel measurements. The tensile tester is set at 300 mm per minute jaw separation rate. Test results are expressed in Newton per 10 mm (N/10 mm) The quoted peel values are the average of two 90°-peel measurements.

Tensile Testing using T-Block Geometry at 100 m/min

The test is carried out at ambient room temperature (23° C. +/−2° C. and 50% +/−5% relative humidity). First, the aluminum T-Block surface is roughened with a ScotchBrite 4774 cleaning sponge and afterwards cleaned with pure isopropanol. The cleaned aluminum T-Block test surface is then further pretreated with a commercially available 3M Primer P94 to avoid pop-off aluminum failures during testing. The liner is first removed from one side of the test specimen. A first aluminum T-Block is then brought onto the exposed adhesive surface of the test specimen and the overstanding adhesive is cut at the edges of the aluminum T-Block. The liner on the other side of the test specimen is thereafter removed and a second primed aluminum T-Block is brought then onto the open adhesive surface and overstanding edges cut off. A force of 300 N +/−5N for 15 seconds is then applied onto the prepared test sample. After a dwell time of at least 24 hours at ambient room temperature (23° C. +/−2° C. and 55% +/−5% relative humidity), the test sample was tested in a Zwick tensile tester by performing a tensile test at 100 mm/min. The complete stress-strain curves as well as the adhesion energy and maximal forces are then collected.

Tensile Testing in OLS (Overlap Shear) Geometry at 100 m/min (in accordance with ASTM D897)

Overlap shear strength was determined according to ASTM D897 using a tensile tester of the type ZWICK/ROELL Z020 (available from Zwick GmbH & Co. KG, Ulm, Germany) at a crosshead speed of 100 mm/min.

For the test assembly preparation two aluminium test panels (as later described under point f.)), are joined in a overlap connection of 10 mm width and 25mm length using pressure sensitive adhesive assemblies of the current disclosure and by pressing these overlap shear test assemblies for 15 seconds with 300N (+/−5N). The test assemblies are then conditioned prior to testing for 24 hours at 23° C. (+/−2° C.) and 50% humidity (+/−5%).

Test Panels/Substrates used for Testing:

a.) Stainless steel substrate: Test panels according to EN1939:20, surface 1.4301 mirror-like (commercially available from Rocholl GmbH) having a dimension of 150 mm×50 mm×2 mm. Prior to testing, the stainless steel panels are cleaned according to the following described procedure. First, the stainless steel panels are wiped once with heptane, then with MEK, followed by a last wipe with heptane and thereafter dried with a paper tissue.

b.) Automotive clear coat panel: CeramiClear5 coated panels available from PPG Industries. The upper listed clear coat includes acrylic resins and polyesters used alone or with mixtures of copolymers comprising hydroxy- or glycidyl-functionalities or carbamatic acid residues (groups); or copolymers of acrylic acid and methacrylic acid esters with hydroxyl groups, free acid groups and further co-monomers (e.g. styrene). Panels are cut prior to 90° peel testing to the requested dimension. Before testing, the automotive clear coat coated panels are cleaned with a 1:1 mixture of distilled water and isopropanol. Test panels are then rubbed dry with a paper tissue.

c.) STA 211 PE is a standard Polyethylene test surface (LSE surface), having a rough and a smooth side. The smooth side is used for testing. STA 211 PE is cleaned, with a 1:1 mixture of isopropylalcohol and distilled water and rubbed dry with a paper tissue after cleaning.

d.) ABS (Acrylonitrile butadiene styrene) test panels having a dimension of 150 m×50 mm×2 mm. These test panels are cleaned with a 1:1 mixture of isopropylalcohol and distilled water and rubbed dry with a paper tissue after cleaning.

e.) Aluminum T-Blocks: AlMg3 (Int. 5754) T-Profile, dimension of 25 mm×25 mm and a height of 25mm with 10 mm wide drilled hole; material thickness 3 mm. The aluminium T-Blocks are cleaned as follows. First, the aluminum T-Block surface is roughened with a ScotchBrite 4774 sponge and then cleaned with pure isopropanol. The cleaned aluminum T-Block test surface is further pretreated with a commercially available 3M Primer P94.

f.) Aluminum test panels in accordance with ASTM B211 having a dimension of 50 mm×25 mm×1 mm. Prior to the preparation of an OLS test assembly, the aluminium panels are roughened using ScotchBrite 4774 (commercially available by 3M) and afterwards wiped once with isopropyl alcohol. Drying is done using a paper tissue. The cleaned aluminum test panel surface is then further pretreated with a commercially available 3M Primer P94.

Raw Materials:

In the examples, the following raw materials are used:

2-Ethyl hexyl acrylate (C8-acrylate, 2-EHA) is an ester of 2-ethylalcohol and acrylic acid which is obtained from BASF AG, Germany. Tg-value:—58° C.

2-Propylheptylacrylate (2-PHA; C10-acrylate) is an ester of 2-propylheptanol and acrylic acid which is obtained from BASF AG, Germany. Tg-value:—68° C. 2-Propylheptylacrylate is a mixture of 2 isomers with a constant distribution.

Acrylic acid is obtained from 3M Hilden, Germany (AA).

Isobornyl acrylate (SR 506D) is a mono-functional acrylic monomer with a high Tg of 66° C., which is commercially available from Cray Valley, France.

ARKON M100 a partially hydrogenated hydrocarbon resin, commercially available from Arakawa Chemical Inc., Chicago, Ill., U.S.A 1,6-Hexanedioldiacrylate is a fast curing diacrylate, obtained from 3M Hilden, Germany (HDA).

OMNIRAD BDK: 2,2-dimethoxy-2-phenylacetophenone is a UV-initiator, commercially available from iGm resins, Waalwijk Netherlands.

3M Glass bubbles (K15) are hollow glass bubbles with a diameter of 115 µm, available from 3M, Germany.

AEROSIL R-972 are hydrophobic fumed silica particles, available from Evonik, Germany.

PROX-AMINE NP 912 GL is a non-ionic low density polyethylene wax emulsion, commercially available from Protex International (Brazil).

SYNTHRO-PEL AGE is an aqueous emulsion of an anti-graffiti compound (mixture of a wax and silicone), commercially available from Protex International (Brazil).

Methyl trimethoxy silane (98%): commercially available from ABCR GmbH & Co. KG, Karlsruhe, Germany.

n-Octyl-trimethoxy silane (98%): commercially available from ABCR GmbH & Co. KG, Karlsruhe, Germany.

Hexadecyl-trimethoxy silane (90%): commercially available from ABCR GmbH & Co. KG, Karlsruhe, Germany.

Tridecafluoro-1,2,2,2-tetrahydrooctyl)-trimethoxy silane (95%): commercially available from ABCR GmbH & Co. KG, Karlsruhe, Germany.

468MP: Transfer tape commercially available from 3M Deutschland GmbH (Germany) and having an adhesive thickness of 0.13 mm.

9472 LE: Transfer tape commercially available from 3M Deutschland GmbH (Germany) and having an adhesive thickness of 0.13 mm.

Surface Treatment of Glass Bubbles

Surface treatment with different silanes is achieved by suspending a defined amount of glass bubbles (as example of hollow non-porous particulate filler material) in a 95/5 (w/w) ethanol/water mixture and adding of a 25% solution of the entire silane in technical ethanol. In a lab-scale procedure, 30 g of glass bubbles K15 are treated with a defined amount of ethanolic silane solution, assuming that all silanol groups on the surface of the glass bubbles can react with hydrolyzed silane molecules. With respect to the different molecular weight of the silanes applied for the surface treatment, different amounts of the ethanolic silane solution are applied for the surface treatment reaction. The exact amounts of silane solution used for the surface treatment of 30 g glass bubbles K15 can be obtained from Table 1 below.

TABLE 1

| Silane | m(GB K15)/g | m(25% silane/ethanol)/mg |
|---|---|---|
| Methyltriethoxysilane | 30 | 193.4 |
| n-Octyltrimethoxysilane | | 256.9 |
| Hexadecyltrimethoxysilane | | 409.4 |
| (Tridecafluoro-1,2,2,2-tetrahydrooctyl)trimethoxysilane | | 524.0 |

In case of the glass bubble surface treatment with the aqueous anti-graffiti compound (Synthro-PEL AGE) and/or surface treatment with non-ionic low density polyethylene wax emulsion (Prox-AMINE NP 912 GL), the K15 glass bubbles (in lab scale, 30 g of K15 glassbubbles are used) are first suspended in a 95/5 ethanol/water mixture followed either by the addition of 21 g Synthro-PEL AGE or 47 g Prox-Amine NP 912 GL.

The upper suspensions are then kept at ambient conditions (23° C. +/−2° C. and 50% rh +/−5%) for 24 hours under constant stirring. Then, the solvents -ethanol and water- are removed from the suspension using a rotary evaporator. Typically, the surface treated glass bubbles are fully dried after 4 hours of drying at 70° C./80 mbar followed by an additional 4 hours at 90° C./20 mbar.

The treated glass bubbles will be referred to in the later description as indicated in Table 2 below:

TABLE 2

| K-15 glass bubbles treated with | Abbreviation |
|---|---|
| Methyltriethoxysilane | K15-C1 |
| n-Octyltrimethoxysilane | K15-C8 |
| Hexadecyltrimethoxysilane | K15-C16 |
| (Tridecafluoro-1,2,2,2-tetrahydrooctyl)trimethoxysilane | K15-FC8 |
| PROX-AMINE NP 912 GL | K15-PROX |
| SYNTHRO-PEL AGE | K15-PEL |

Preparation of the Liquid Precursor for the First Pressure Sensitive Adhesive Layer (Foam Layer):

Liquid Precursor Foams (LPF 1-11):

The liquid precursors of the first pressure sensitive adhesive layer (foam layer), hereinafter referred to as LPF 1-11, are prepared by combining the C8 acrylate (2-EHA) and the acrylic acid with 0.04 pph of OMNIRAD as a photoinitiator in a glass vessel. Before the UV exposure is initiated, the mixture is flushed 10 minutes with nitrogen and nitrogen is also bubbled into the mixture the whole time until the polymerization process is stopped by adding air to the syrup. All the time, the mixture is stirred with a propeller stirrer (300 U/min) and the reaction is stopped when a viscosity comprised between 2000 and 4500 mPa is reached (when measured with a Brookfield viscosimeter, T=25 ° C., spindle 4, 12 rpm). Additionally, the remaining amount of OMNIRAD BDK, the HDDA crosslinker, the untreated (LPF 1, LPF 8) or treated glass bubbles or mixtures thereof (LPF 2-7 and LPF 9-11) are added to the syrup and mixed until they have dissolved/dispersed. The exact formulations of the liquid precursors for the first pressure sensitive adhesive layer are listed (in pph) in Table 3 below.

TABLE 3

| Raw materials | LPF 1 | LPF 2 | LPF 3 | LPF 4 | LPF 5 | LPF 6 | LPF 7 | LPF 8 | LPF 9 | LPF 10 | LPF 11 |
|---|---|---|---|---|---|---|---|---|---|---|---|
| 2-EHA | 90 | 90 | 90 | 90 | 90 | 90 | 90 | 90 | 90 | 90 | 90 |
| AA | 10 | 10 | 10 | 10 | 10 | 10 | 10 | 10 | 10 | 10 | 10 |
| HDDA | 0.1 | 0.1 | 0.1 | 0.1 | 0.1 | 0.1 | 0.1 | 0.1 | 0.1 | 0.1 | 0.1 |
| OMNIRAD BDK | 0.2 | 0.2 | 0.2 | 0.2 | 0.2 | 0.2 | 0.2 | 0.2 | 0.2 | 0.2 | 0.2 |
| AEROSIL | | | | | | | | | 3 | 3 | 3 |
| GB K15 | 12 | | | | | | | 6 | 4 | 2 | |
| K15-C1 | | 12 | | | | | | | | | |
| K15-C8 | | | 12 | | | | | | 2 | 4 | 6 |
| K15-C16 | | | | 12 | | | | | | | |
| K15-FC8 | | | | | 12 | | | | | | |
| K15-PROX | | | | | | 12 | | | | | |
| K15-PEL | | | | | | | 12 | | | | |

For coating the upper liquid precursors of the first pressure sensitive adhesive layer, the line speed of the coater is set to 0.82 m/min. The resulting adhesive layer thickness was about 1.2 mm. Curing is accomplished in a UV-curing station with a length of 300 cm at the line speed given above. The total radiation intensity irradiated cumulatively from top and bottom and the respective length of the two coating zones within the UV-curing station as follows:

TABLE 4

| | Zone 1 (length from 0 to 200 cm) | Zone 2 (length from 200 to 300 cm) |
|---|---|---|
| Total intensity [mW/cm$^2$] | 2.07 | 4.27 |

Preparation of the Liquid Precursor for the Skin Layer LPS 1 of the Multilayer Pressure Sensitive Adhesive Assemblies of Ex. 10 and Ex. 11

The different pressure sensitive adhesive layers used for examples 10 and 11 are prepared according to the method described in WO 2011094385(A1) by initially pre-polymerizing the acrylate and acrylic acid (AA) monomers in a vessel containing 0.04 ppH of Omnirad BDK as a photoinitiator and then exposing the mixture to ultraviolet radiation until a coatable syrup with a viscosity of about 11000 mPas (when measured with a Brookfield viscosimeter, T=25 ° C., spindle 4, 12 rpm) is obtained.

Before the UV-exposure, the mixture is flushed 10 minutes with nitrogen and nitrogen is also bubbled to the mixture until the polymerization process is stopped by adding air to the syrup. All the time, the mixture is stirred with a propeller stirrer (300U/min) and the reaction is stopped when a viscosity of about 11000 mPas is reached. Additional co-monomer(s), Omnirad BDK, tackifier and HDDA crosslinker are added to the syrup and mixed until they have dissolved. The skin syrup is then coated with a lab coater as described in WO 2011094385(A1) on the bottom to the filled core with a thickness of approx. 70-90 μm. The dual (or triple) layer construction is coated on 75 μm solvent free siliconized PET-liners (SLVK-Liner having a dimension of 300 mm×300 mm)

The liquid skin precursor used for Ex. 10 and 11 is referred to in Table 5 below as LPS 1.

TABLE 5

| | 2-PHA | AA | IBOA | Omnirad BDK | HDDA | Arkon M100 |
|---|---|---|---|---|---|---|
| LPS 1 | 75 | 5 | 20 | 0.2 | 0.13 | 15 |

Preparation of Multilayer Pressure Sensitive Adhesive Assemblies for Ex. 1-Ex. 9 and Comparative Examples C1 and C3.

The lamination of the first pressure sensitive adhesive layer with a second and/or third pressure sensitive adhesive skin layer (either transfer tape 468MP or 9472 LE, commercially available by 3M) is carried out at a temperature of 100° C. by the use of a laminator from the company Sallmetall. The contact pressure is between 1-2 bar with a velocity of 1 m/min. The film is subjected twice to this procedure. After the lamination, the multilayer PSA assemblies are allowed to dwell for 24 h at room temperature (23° C. +/−2° C.) prior to testing.

Preparation of Multilayer Pressure Sensitive Adhesive Assemblies for Ex. 10 and Ex. 11.

The foam and skin liquid precursor formulations of examples 11 and 12 are superimposed on one another as described in WO 2011094385(A1) in a lab coater. The knife height setting is 130-140 μm for the first knife (for the skin pressure sensitive adhesive layer) and 1240-1250 μm for the second knife (for the opposing layer (foam)), both levels calculated from the substrate surface.

The lab coater is connected to a UV curing station of 3 m length, where zones of different UV-intensities can be realized. The UV-radiation cures the tape from both its top and bottom side. Hereby in all zones the intensity from top and bottom side is set at equal levels. The total radiation intensities (top+bottom) and the length of the different zones are listed in Table 6 below.

TABLE 6

UV Intensity of the Lab coater curing station.

| | Zone 1 Length (200 cm) | Zone 2 (length 100 cm) |
|---|---|---|
| Total intensity [mW(cm2] | 2.07 | 4.27 |

Examples used for Testing

The tested examples are listed in Table 7 below.

TABLE 7

| Example No. | LPF used | Skin layer used |
|---|---|---|
| C1 | LPF 1 | on one side (468MP) |
| C2 | LPF 1 | No |
| C3 | LPF1 | on one side (9472 LE) |
| Ex. 1 | LPF 2 | on one side (468 MP) |
| Ex. 2 | LPF 3 | on one side (468 MP) |
| Ex. 3 | LPF 4 | on one side (468 MP) |
| Ex. 4 | LPF 5 | on one side (468 MP) |
| Ex. 5 | LPF 6 | on one side (468 MP) |
| Ex. 6 | LPF 7 | on one side (468 MP) |
| Ex. 7 | LPF 3 | on one side (9472 LE) |
| Ex. 8 | LPF 4 | on one side (9472 LE) |
| Ex. 9 | LPF 5 | on one side (9472 LE) |
| Ex. 10 | LPF 1 | LPS 1 |
| Ex. 11 | LPF 3 | LPS 1 |
| Ex. 12 | LPF 3 | No |
| Ex. 13 | LPF 8 | No |
| Ex. 14 | LPF 9 | No |
| Ex. 15 | LPF 10 | No |
| Ex. 16 | LPF 11 | No |
| Ex. 17 | LPF 2 | No |
| Ex. 18 | LPF 4 | No |
| Ex. 19 | LPF 5 | No |
| Ex. 20 | LPF 6 | No |
| Ex. 21 | LPF 7 | No |

Test Results

90° Peel Results on CeramiClear5 (72 h at Room Temperature)

TABLE 8

| Example No. | Peel value (N/cm) |
|---|---|
| C1 | 21 |
| Ex. 1 | 28 |
| Ex. 2 | 30 |
| Ex. 3 | 32 |
| Ex. 5 | 26 |

The results of the 90° Peel results on CeramiClear5 are shown in Table 8. Table 8 shows an increasing peel performance versus the comparative example C1 with the increasing level of hydrophobicity of the surface treatment of the glass bubbles from Ex. 1 to Ex. 3 with the alkoxysilanes. The improved effect on peel by using hydrophobized glass bubbles is also seen in Ex. 5, which uses glass bubbles surface-treated with a hydrophobic coating.

90° Peel on ABS (72h, Room Temperature)

The results of a first pressure sensitive adhesive layer (foam layer) without any additional layers, but comprising C8 treated glass bubbles versus a first pressure sensitive adhesive layer comprising untreated K15 glass bubbles is shown in Table 9 below.

TABLE 9

| Example No. | Peel value (N/cm) |
| --- | --- |
| C2 | 15 |
| Ex. 12 | 24 |

The peel increasing effect of the surface treated glass bubbles can clearly be seen from the results of Table 9.

To further investigate the peel increasing effect of untreated glass bubbles versus C8 treated glass bubbles within multilayer pressure sensitive adhesive assemblies, skin/core/skin pressure sensitive adhesive assemblies (examples 10 and 11) are made according to the process disclosed in WO2011/094385 from superimposed layers cured in one step. The corresponding peel results on ABS are listed in Table 10 below. As it can be seen from Table 10, the level of peel force increases by about 6 N/cm when using the C8 treated glass bubbles.

TABLE 10

| Example No. | Peel value (N/cm) |
| --- | --- |
| Ex. 10 | 25 |
| Ex. 11 | 31 |

90° Peel on LDPE (STA211) (72h, Room Temperature)

Table 11 shows the 90° peel results for Ex. 7 to Ex. 9 and includes C3 as a comparative example. All of these examples have in common that their adhesive skin layers are made using transfer tape 9472 LE (commercially available by 3M).

TABLE 11

| Example No. | Peel value (N/cm) |
| --- | --- |
| C3 | 15 |
| Ex. 7 | 16 |
| Ex. 8 | 18 |
| Ex. 9 | 16 |

90° Peel on Stainless Steel (72 h, Room Temperature)

Table 12 shows the 90° peel results on stainless steel of various first pressure sensitive adhesive layers comprising an increasing amount of surface treated glass bubbles.

TABLE 12

| Example No. | Peel value (N/cm) |
| --- | --- |
| Ex. 13 | 31 |
| Ex. 14 | 34 |
| Ex. 15 | 36 |
| Ex. 16 | 42 |

Results clearly show an increasing peel performance with an increasing amount of the octyl-silane functionalized glass bubbles. The step-wise replacement of a third of the untreated glass bubbles with treated glass bubbles leads to an approximate peel increase of 5-10%. By completely replacing the untreated glass bubbles with the treated glass bubbles a total increase from 31 N/cm to 42 N/cm is achieved.

OLS and T-Block Tensile Results

The results of the OLS tensile testing are provided in Table 13. In the table, the resulting forces at 2 mm and 4 mm elongation are listed.

TABLE 13

| Example No. | F (2 mm)/N | F (4 mm)/N |
| --- | --- | --- |
| C2 | 108 | 188 |
| Ex. 12 | 89 | 141 |
| Ex. 18 | 88 | 135 |
| Ex. 19 | 71 | 114 |
| Ex. 20 | 69 | 124 |
| Ex. 21 | 77 | 121 |

The results of the T-block tensile testing are provided in Table 14. In the table, the resulting forces at 2 mm and 4 mm elongation are listed.

TABLE 14

| Example No. | F (2 mm)/N | F (4 mm)/N |
| --- | --- | --- |
| C2 | 397 | 412 |
| Ex. 17 | 359 | 387 |
| Ex. 12 | 295 | 308 |
| Ex. 18 | 249 | 263 |
| Ex. 19 | 227 | 257 |
| Ex. 20 | 293 | 253 |
| Ex. 21 | 226 | 251 |

The results of the mechanical tensile testing in OLS and T-block geometry show a significant softening of the first pressure sensitive adhesive foam layer by incorporation of hydrophobic treated glass bubbles. This is in-line with the findings of the 90° peel results. Without wishing to be bound by theory, it is believed there is a clear correlation between the mechanical properties and the peel values obtained for the corresponding pressure sensitive adhesive assemblies. All samples pass static shear tests at elevated temperatures.

B) Examples 22 to 26

Test Methods Applied:
180°-Peel Adhesion Test at 305 mm/min (according to Test Method, ASTMD 3330):

A strip of a pressure sensitive adhesive assembly according to the present disclosure is applied to a standard test panel with a controlled pressure applied by a steel roller. The tape is peeled from the panel at 180° angle at a rate of 305 mm /sec, during which time the force required to effect peel is measured. The specimen for testing shall be 24 mm wide and 300 mm long. The specimens are cut out in the machine direction from the sample material. The samples of tape are conditioned in the standard conditions atmosphere as (23° C., 50% relative humidity) prior to the testing for a period of not less than 24 h. The steel roller has a diameter of 85 mm and a width of 45 mm, covered with rubber having a thickness of 6 mm and having a Shore scale A durometer hardness of 80. The mass of the steel roller is 2.0 kg. The roller is moved either mechanically or by hand at the rate of 10 mm/s.

For peel testing, the test samples are in a first step clamped in the IMASS peel tester (Model SP2000 commercially available from IMASS Inc., USA). The multilayer pressure sensitive adhesive film strips are folded back at an angle of 180° and their free ends grasped in the jaw of the peel tester in a configuration commonly utilized for 180° peel measurements. The peel tester is set at 305 mm per minute peel rate. Test results are expressed in N per cm [N/cm] The quoted peel values are the average of six 180°-peel measurements & dwell time is given 15 to 20 minutes after tape is applied on the standard test panel before testing.

Static Shear Test at Room Temperature (according to Test Method, ASTMD 3654):

This test method measures the shear adhesion when applied to a vertical standard steel panel. A strip of PSA assembly tape is applied to a standard steel panel under controlled roll down. The panel is mounted vertically, a standard mass is attached to the free end of the tape and the time to failure is determined For this procedure, standard stainless steel 304 panels having a dimension of 50×75 mm, and not less than 1.1 mm thickness are used.

For the controlled roll down, a steel roller 85 mm in diameter and 45 mm width, covered with rubber approximately 6 mm [0.25 in.] in thickness, and having a Shore scale A durometer hardness of 80 is used. The mass of the roller is 2.0 kg. The roller is moved either mechanically or by hand at the rate of 10 mm/s.

For the test stand that shall hold the test panel, with tape applied, at an angle of 0 to 2° with the vertical, so that when the mass is acting on the test specimen, no peel forces will be exerted on the tape. The test mass is 1000 g. The mass of the clamp or hook shall be included as part of the total mass. For the test, it measures the interval in minutes, between the application of the load to the specimen and its separation from the panel. The test specimens are 24 mm and 150 mm long. Condition the sample rolls of tape in the standard conditioning atmosphere as (23° C. +/−2° C., 50% relative humidity +/−5%) prior to the testing for a period of not less than 24 h.

For sample preparation, center the test specimen on the 50 mm dimension at one end of the test panel and apply, without added pressure, to cover an area exactly 24×24 mm, with tape. To prevent cutting of the specimen by the end of the panel during roll down, place another panel of the same or slightly lesser thickness and as wide as the test panel, under the free masked end of the specimen, and in contact with the end of the panel prior to roll down. Place clamp or hook on the free end of the tape specimen, ensuring that the clamp or hook extends completely across the width of the specimen and is aligned to uniformly distribute the load. Place the test assembly in the test stand so that the free end of the test specimen is vertical, ensuring that no peel forces act on the specimen. Apply the 1000 g mass to the clamp or hook gently so as to cause no shear impact force on the tape specimen. Record the time elapse in which the tape specimen has separated completely from the test panel. For this test procedure, RT 30 bank static shear tester (from Cheminstruments Inc, USA) is used.

Test Panels/Substrates used for Testing:

a.) Stainless Steel Substrate:

Test panels according to ASTM A666 are made of 304 (composition is 18% chromium and 8% nickel) stainless steel material. The 18 gauge panels have the Bright Annealed finish and are cut to size for use in various test methods. All Stainless steel panels are 1.2 mm thick and are commercially available from Cheminstruments Inc. USA. The stainless steel panels size are 5 cm×13 cm (for peel adhesion testing) and 5cm×7.5 cm (for static shear testing).

Prior to testing, the stainless steel panels are cleaned according to the following described procedure. First, the stainless steel panels are wiped once with heptane, then with ethyl acetate, followed by a last wipe with heptane and thereafter dried with a paper tissue.

b.) PP/HDPE/LDPE Substrates:

Polypropylene, high density polyethylene, low density polyethylene specialized test panels used herein are commercially available from Cheminstruments Inc, USA and have a dimension of 5 cm×13 cm.

Prior to testing, the panels are cleaned according to the following described procedure. The panels are wiped with ethyl acetate and thereafter dried with a paper tissue.

Raw Materials:

In the following examples, the following raw materials are used:

2-Ethylhexyl acrylate (C8-acrylate, 2-EHA) is an ester of 2-ethylalcohol and acrylic acid which is obtained from LOBA Chemie Pvt. Ltd, India. Tg-value:—68° C.

n-butyl acrylate (BA; C4-acrylate) is an ester of n butanol and acrylic acid which is obtained from LOBA Chemie Pvt. Ltd, India. Tg-value:—58° C.

Acrylic acid (AA) is obtained from LOBA Chemie Pvt. Ltd, India.

Ethyl acetate is obtained from Merk Speciality Private Limited, Mumbai, India.

Toluene is obtained from Merk Speciality Private Limited, Mumbai, India.

AIBN (Azobisisobutyronitrile—98%) is a free radical-initiator, commercially available from Avra Synthesis Pvt. Ltd., India.

3M Glass bubbles (S60/HS) are hollow glass bubbles with a diameter of 60 μm, available from 3M, USA.

n-propyl trimethoxysilane (97%) is an alkyl functional silane, available from Sigma Aldrich, India.

Isopropanol alchohol (IPA) is obtained from Merk Speciality Private Limited, Mumbai, India.

Hydrogen peroxide ($H_2O_2$—30%) is obtained from Merk Speciality Private Limited, Mumbai, India.

HCl (.Hydrochloric acid—35%) is obtained from Merk Speciality Private Limited, Mumbai, India Surface Treatment of Glass Bubbles:

S60/HS glass bubbles were boiled in hydrogen peroxide (30% from Merck) at 105° C. for one hour in a bottle and then glass bubbles were vacuum filtered. Hydrolysis of N-propyl trimethoxysilane was carried out for 5 hours with 2% silane solution in isopropanol alchohol (IPA) along with one drop of hydrochloric acid at room temperature with continuous stirring in closed bottle. Then, filtered glass bubble was added in the hydrolyzed N-propyl trimethoxysilane solution and kept in launderometer for 24 hours at 60° C.

Preparation of the Adhesive Composition:

Adhesive composition details:

Monomer ratio: 2-ethylhexyl acrylate (2-EHA): n-butyl acrylate (BA): acrylic acid (AA)=20:75:5

Solvent ratio: Ethyl acetate: Toluene (50:50).

Initiator (AIBN): 0.2% of monomer charged.

Functionalized glass bubbles: 1% of monomer charged.

The above adhesive composition is charged in a closed glass bottle and kept for polymerization in launderometer equipment at constant temperature of 60° C. for continuous 24 hours reaction in inert atmosphere ($N_2$ gas atmosphere) or it can be polymerized in a three neck glass round bottom flask with distillation and condenser assembly. Temperature was kept constant at 60° C. and the reaction was carried out for continuous 24 hours under continuous stirring and nitrogen gas was purged to create the inert atmosphere.

Comparative Experiments:

Five samples were polymerized for evaluation. Monomer ratio was kept constant at 45% and solvent were kept constant at 55%. Initiator was used at 0.2% of monomer charge.

Composition 1 (Blank sample):

Monomer ratio: 2-ethylhexyl acrylate (2-EHA): N-butyl acrylate (BA): acrylic acid (AA)=20:75:5.

Solvent ratio: Ethyl acetate : Toluene=50:50.

Initiator (AIBN): 0.2% of monomer charged.

In compositions 2 to 5, glass bubbles were added at 0.1% and 1% of monomer was charged.

The samples details are as follows:

TABLE 15

| Raw materials | Example 22 Composition 1 | Example 23 Composition 2 | Example 24 Composition 3 | Example 25 Composition 4 | Example 26 Composition 5 |
|---|---|---|---|---|---|
| 2-EHA | 9 | 9 | 9 | 9 | 9 |
| n-BA | 33.75 | 33.75 | 33.75 | 33.75 | 33.75 |
| AA | 2.25 | 2.25 | 2.25 | 2.25 | 2.25 |
| Ethyl acetate | 27.5 | 27.5 | 27.5 | 27.5 | 27.5 |
| Toluene | 27.5 | 27.5 | 27.5 | 27.5 | 27.5 |
| AIBN | 0.09 | 0.09 | 0.09 | 0.09 | 0.09 |
| Silane treated S60/HS GB | 0 | 0 | 0 | 0.045 | 0.45 |
| S60/HS GB | 0 | 0.045 | 0.45 | 0 | 0 |

Polymerization was carried out in a bottle in launderometer equipment at 60° C. for 24 hours. Polymerization conditions for all the five compositions mentioned above were kept constant.

Adhesive sample was then coated after 48 hours using comma bar lab coater on a 50 micron white polyester backing film and laminated with 120 g/cm² PCK liner. Coated samples were kept for 24 hours at constant temperature/constant humidity controlled room (23+2° C., 50+5% relative humidity) (CTH) condition then tested for 180 Degree Peel adhesions on SS/PP/HDPE/LDPE substrates. Also static shear at room temperature was evaluated.

Test Results:

Target dry adhesive g/cm² on 50 micron white polyester film=30 +/−2 for all the samples. 1% of treated and untreated glass bubble in the adhesive formulation as mentioned above in Table 15.

TABLE 16

180 Deg Peel adhesion as per ASTM-D 3330

1800 Peel adhesion (N/cm)

| Substrates | | Composition 1 | Composition 3 | Composition 5 |
|---|---|---|---|---|
| SS Panel | Average | 5.68 | 8.11 | 9.66 |
| | Standard deviation | 0.08 | 0.46 | 0.69 |
| PP Panel | Average | 5.02 | 9.15 | 10.62 |
| | Standard deviation | 0.19 | 0.42 | 0.08 |
| HDPE Panel | Average | 1.93 | 2.93 | 9.46 |
| | Standard deviation | 0.34 | 0.19 | 0.42 |
| LDPE Panel | Average | 2.51 | 2.62 | 8.69 |
| | Standard deviation | 0.38 | 0.23 | 0.58 |

TABLE 17

Static Shear Results:

Static shear at room temperature

| | Average value (minutes) | Std. dev. (minutes) | Failure mode |
|---|---|---|---|
| Composition 1 | 40 | 5 | cohesive |
| Composition 3 | 28 | 6 | cohesive |
| Composition 5 | 20 | 2 | cohesive |

The above data is the average of 6 samples tested for each composition. The above results are of base adhesive only, without any tackification and crosslinking. Very good results at 1% of functionalized glass bubble loaded adhesive on HDPE and LDPE substrates were observed. Even on SS an PP substrates also there was some improvement in the peel adhesion values, static shear values.

With the addition of 1.0% functionalized glass bubbles in the acrylate adhesive, it shows 60 to 70% improvement in 180 Degree peel adhesion on stainless steel, 100% improvement in 180 deg peel adhesion on polypropylene, 300% improvement in 180 Degree peel adhesion on HDPE, 250% improvement in 180 Degree peel adhesion on LDPE substrates.

We claim:

1. A multilayer pressure sensitive adhesive assembly comprising:
a first pressure sensitive adhesive layer comprising a hollow non-porous particulate filler material, wherein the surface of the hollow non-porous particulate filler material is provided with a hydrophobic surface modification by chemically reacting said non-porous particulate filler material with an alkoxy silane subjected to a partial or total hydrolysis treatment, the alkoxy silane having the following formula:

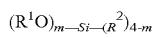

wherein $R^1$ is an alkyl group comprising 1 to 6 carbon atoms, m=1 to 3, and $R^2$ is a hydrophobic moiety selected from the group consisting of saturated, unsaturated, substituted or un-substituted alkyls, ethers, thioethers, esters, amides, amines, carbamates, urethanes, polyolefins, and any combinations thereof;
wherein the hollow non-porous particulate filler material consists of hollow glass microspheres, and wherein the first pressure sensitive adhesive layer is a polymeric foam layer and having a thickness in a range of 100 to 6000 micrometers, the first pressure sensitive adhesive layer comprising a polymer base material comprised of a polar acrylate comonomer; and
a second pressure sensitive adhesive layer adjacent to and separate from the first pressure sensitive adhesive layer, wherein the second pressure sensitive adhesive layer is an unfoamed skin layer that does not contain any hollow non-porous particulate filler material and has a thickness in a range of 20 to 250 micrometers,
wherein the hollow non-porous particulate filler material provided with a hydrophobic surface modification leads to increased debonding between the polymer base material and the surface of the hollow non-porous particulate filler material.

2. A multilayer pressure sensitive adhesive assembly according to claim 1, wherein the hydrophobic surface modification of the hollow non-porous particulate filler material is performed with alkyl groups through covalent bonds, preferably through covalent siloxane bonds, between the alkyl groups and the surface of the hollow non-porous particulate filler material.

3. A multilayer pressure sensitive adhesive assembly according to claim 1, wherein the alkoxy silane has the following formula:

$$(R^1O)_{m}-Si-(R^2)_{4-m}$$

wherein:
R$^1$ is selected from the group consisting of methyl and ethyl;
m=2 or 3 R$^2$ is independently selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and fluorinated derivatives thereof, tridecafluroro-1,2,2,2-tetrahydrooctyl.

4. A multilayer pressure sensitive adhesive assembly according to claim 3, wherein the surface of the hollow non-porous particulate filler material is pre-treated with hydrogen peroxide prior to being provided with a hydrophobic surface modification.

5. A multilayer pressure sensitive adhesive assembly according claim 1, wherein the hydrophobic surface modification of the hollow non-porous particulate filler material is performed by applying a hydrophobic coating.

6. A multilayer pressure sensitive adhesive assembly according to claim 5, wherein the hydrophobic coating is applied by contacting the hollow non-porous particulate filler material with a liquid medium selected from the group of emulsions, suspensions or solutions, and comprising a component preferably selected from the group consisting of alkoxy silanes, hydrocarbon waxes, polyethylene waxes, fluorinated hydrocarbon waxes, silicone, and any combinations or mixtures thereof.

7. A multilayer pressure sensitive adhesive assembly according to claim 1, which is in the form of a skin/core multilayer pressure sensitive adhesive assembly, wherein the first pressure sensitive adhesive layer is the core layer of the multilayer pressure sensitive adhesive assembly and the second pressure sensitive adhesive layer is the skin layer of the multilayer pressure sensitive adhesive assembly.

8. A multilayer pressure sensitive adhesive assembly according claim 1, wherein the first pressure sensitive adhesive layer and/or the second pressure sensitive adhesive layer comprises a polymer base material selected from the group consisting of polyacrylates, polyurethanes, polyolefins, polyamines, polyamides, polyesters, polyethers, polyisobutylene, polystyrenes, polyvinyls, polyvinylpyrrolidone, natural rubbers, synthetic rubbers, and any combinations, copolymers or mixtures thereof.

9. A multilayer pressure sensitive adhesive assembly according to claim 8, wherein the first pressure sensitive adhesive layer and/or the second pressure sensitive adhesive layer a polymer base material selected from the group consisting of polyacrylates whose main monomer component preferably comprises a linear or branched alkyl (meth) acrylate ester, preferably a non-polar linear or branched alkyl (meth)acrylate ester having a linear or branched alkyl group comprising preferably from 1 to 32, from 1 to 20, or even from 1 to 15 carbon atoms.

10. The multilayer pressure sensitive adhesive assembly of claim 1, wherein the polar acrylate comonomer comprises acrylic acid, methacrylic acid, itaconic acid, hydroxyalkyl acrylate, acrylamide, substituted acrylamide, acrylamine, substituted acrylamine, acrylonitrile, methacrylonitrile, hydroxyalkyl acrylate, cyanoethyl acrylate, maleic anhydride, N-vinyl-2-pyrrolidone, N-vinyl-caprolactam, or a combination or mixture thereof.

* * * * *

UNITED STATES PATENT AND TRADEMARK OFFICE
CERTIFICATE OF CORRECTION

| | | |
|---|---|---|
| PATENT NO. | : 11,518,914 B2 | Page 1 of 1 |
| APPLICATION NO. | : 14/888810 | |
| DATED | : December 6, 2022 | |
| INVENTOR(S) | : Jan Heimink et al. | |

It is certified that error appears in the above-identified patent and that said Letters Patent is hereby corrected as shown below:

In the Claims

<u>Column 44</u>
Line 40, In Claim 1, delete "$(R^1O)_{m-Si-(R^2)4-m}$" and insert -- $(R^1O)_m$-Si-$(R^2)_{4-m}$ --, therefor.

<u>Column 45</u>
Line 8, In Claim 3, delete "$(R^1O)_{m-Si-(R^2)4-m}$" and insert -- $(R^1O)_m$-Si-$(R^2)_{4-m}$ --, therefor.

Signed and Sealed this
Ninth Day of April, 2024

*Katherine Kelly Vidal*

Katherine Kelly Vidal
*Director of the United States Patent and Trademark Office*